(12) United States Patent
Min et al.

(10) Patent No.: US 8,482,722 B2
(45) Date of Patent: Jul. 9, 2013

(54) DELAY COMPENSATION IN MODULATED OPTICAL TIME-OF-FLIGHT PHASE ESTIMATION

(75) Inventors: Dong Ki Min, Seoul (KR); Young Gu Jin, Hwaseong-si (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 333 days.

(21) Appl. No.: 12/839,840

(22) Filed: Jul. 20, 2010

(65) Prior Publication Data

US 2011/0051119 A1 Mar. 3, 2011

(30) Foreign Application Priority Data

Sep. 1, 2009 (KR) .................. 10-2009-0082150

(51) Int. Cl.
*G01C 3/08* (2006.01)
(52) U.S. Cl.
USPC ............ 356/5.1; 356/4.01; 356/4.1; 356/5.01
(58) Field of Classification Search
USPC ............ 356/3.01–3.15, 4.01–4.1, 5.01–5.15, 356/6–22, 28, 28.5, 139.01–139.1
See application file for complete search history.

(56) References Cited

U.S. PATENT DOCUMENTS

| | | | |
|---|---|---|---|
| 5,892,575 A | 4/1999 | Marino | |
| 6,445,815 B1 | 9/2002 | Sato | |
| 6,906,793 B2 | 6/2005 | Bamji et al. | |
| 6,919,549 B2 | 7/2005 | Bamji et al. | |
| 7,012,248 B2 | 3/2006 | Paschalidis | |
| 7,362,419 B2 | 4/2008 | Kurihara et al. | |
| 8,063,368 B1 * | 11/2011 | Youngs et al. | 250/334 |
| 2005/0031166 A1 | 2/2005 | Fujimura et al. | |
| 2006/0192938 A1 | 8/2006 | Kawahito | |
| 2008/0231832 A1 * | 9/2008 | Sawachi | 356/5.1 |
| 2009/0116720 A1 | 5/2009 | Ritman | |

* cited by examiner

*Primary Examiner* — Luke Ratcliffe
(74) *Attorney, Agent, or Firm* — F. Chau & Associates, LLC

(57) ABSTRACT

A distance measurement method includes measuring a plurality of integrated signals at a plurality of modulation phase offsets; estimating at least one integrated signal for at least one of the plurality of modulation phase offsets, respectively, to adjust its reception time relative to an integrated signal for another of the plurality of modulation phase offsets; and determining a distance between the target and receiver in accordance with the estimated at least one signal.

30 Claims, 35 Drawing Sheets

FIG. 15
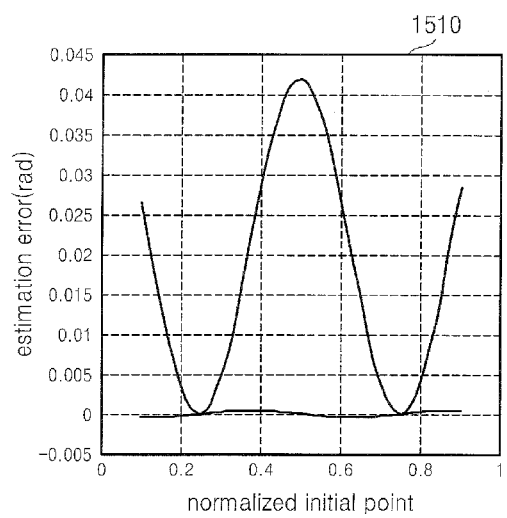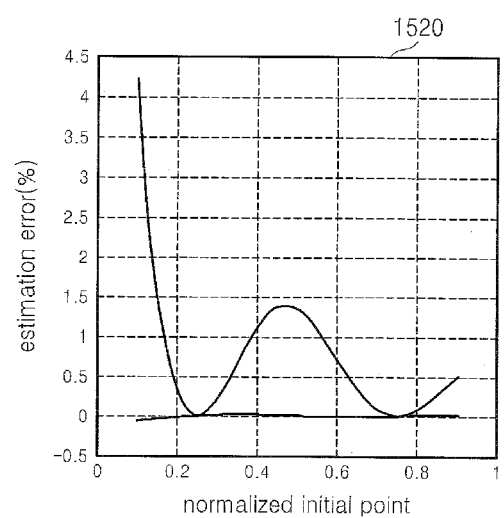

DELAY COMPENSATION IN MODULATED OPTICAL TIME-OF-FLIGHT PHASE ESTIMATION

CROSS-REFERENCE TO RELATED APPLICATION

This application claims foreign priority under 35 U.S.C. §119 to Korean Patent Application No. 10-2009-0082150, filed on Sep. 1, 2009, in the Korean Intellectual Property Office, the disclosure of which is incorporated by reference herein in its entirety.

BACKGROUND OF THE INVENTION

The present disclosure generally relates to contactless three-dimensional (3D) shape measurements. More particularly, the present disclosure relates to contactless 3D shape measurement methods and devices using delay compensation in modulated optical time-of-flight phase estimation.

Contactless 3D shape measurements may use pressure wave or electromagnetic wave emissions. Pressure waves may be ultrasonic signals, for example. Electromagnetic wave emissions may be microwaves or light waves (e.g., $l=0.5$-$1.0$ um; $f=300$-$600$ THz), for example. For light wave emissions, 3D sensing methods include triangulation, interferometry, and time-of-flight (TOF). Triangulation performs depth detection using geometric angle measurements. Interferometry performs depth detection using optical coherent time-of-flight measurements. TOF may perform depth detection using either pulsed or modulated continuous-wave (CW) optical incoherent time-of-flight measurements.

Pulsed type TOF features range sensing by measuring the turn-around time, reduced influence of background illumination, high signal-to-noise ratio (SNR) with low average power for eye safety, low repetition rate (e.g., 10 kHz) of the laser diode (LD) and a low frame rate. Unfortunately, it can be difficult to form pulses with sufficiently short rise and fall times, and dispersion and attenuation can become issues.

Modulated CW type TOF features range sensing by measuring phase differences. Modulated TOF can use a wide variety of light sources, such as sinusoidal, square wave, and the like.

SUMMARY OF THE INVENTION

The present disclosure teaches contactless three-dimensional shape measurement using delay compensation in modulated optical time-of-flight phase estimation. Exemplary embodiments are provided.

An exemplary embodiment distance measurement method includes measuring a plurality of integrated signals at a plurality of modulation phase offsets; estimating at least one integrated signal for at least one of the plurality of modulation phase offsets, respectively, to adjust its reception time relative to an integrated signal for another of the plurality of modulation phase offsets; and determining a distance between the target and receiver in accordance with the estimated at least one signal.

A further exemplary embodiment includes emitting narrow band electromagnetic energy as a modulated continuous wave; and receiving and integrating signals indicative of electromagnetic energy reflected from a target for the plurality of modulation phase offsets.

A further exemplary embodiment includes estimating comprising interpolating the at least one integrated signal at a first time with the at least one integrated signal at a second time, wherein the first time is before the reception time of the integrated signal for the other of the plurality of modulation phase offsets, and the second time is after the reception time of the integrated signal for the other of the plurality of modulation phase offsets.

A further exemplary embodiment includes estimating comprising extrapolating the at least one integrated signal at a current time from the at least one integrated signal at a plurality of previous times, wherein the current time is the reception time of the integrated signal for the other of the plurality of modulation phase offsets.

A further exemplary embodiment has estimating comprising splitting a time difference between a first integrated signal and a second integrated signal to obtain a median time, interpolating the first integrated signal at a first time with the first integrated signal at a third time to obtain an estimated first integrated signal at the median time, wherein the first time is before the median time and the third time is after the median time, interpolating the second integrated signal at a second time with the second integrated signal at a fourth time to obtain an estimated second integrated signal at the median time, wherein the second time is before the median time and the fourth time is after the median time.

A further exemplary embodiment has the narrow band electromagnetic energy has a wavelength between about 850 and about 950 nanometers.

A further exemplary embodiment has the plurality of modulation phase offsets comprises four equally spaced offsets. Another exemplary embodiment has first, second, third and fourth signals for zero degree, 90 degree, 180 degree and 270 degree phase offsets, respectively, are received and integrated by at least one photo sensor. Yet another exemplary embodiment has the at least one photo sensor comprises color pixels and distance pixels, the color pixels disposed on a first integrated circuit and the distance pixels disposed on a second integrated circuit. A further exemplary embodiment has the at least one photo sensor comprises color pixels and distance pixels on a single integrated circuit.

An exemplary embodiment distance measurement system includes a narrow band source for emitting electromagnetic energy as a modulated continuous wave; a photo sensor for receiving and integrating signals indicative of electromagnetic energy reflected from a target for a plurality of modulation phase offsets; and a control unit for measuring a plurality of integrated signals at the plurality of modulation phase offsets, estimating at least one integrated signal for at least one of the plurality of modulation phase offsets, respectively, to adjust its reception time relative to an integrated signal for another of the plurality of modulation phase offsets, and determining a distance between the target and receiver in accordance with the compensated at least one signal.

A further exemplary embodiment has the source emits narrow band electromagnetic energy with a wavelength between about 850 and about 950 nanometers. An alternate exemplary embodiment has the plurality of modulation phase offsets comprises four equally spaced offsets. A further exemplary embodiment has first and third signals for zero degree and 180 degree phase offsets, respectively, are received and integrated by the photo sensor, and second and fourth signals for 90 degree and 270 degree phase offsets, respectively, are received and integrated by a second photo sensor. An alternate exemplary embodiment has first, second, third and fourth signals for zero degree, 90 degree, 180 degree and 270 degree phase offsets, respectively, received and integrated by the photo sensor. A further exemplary embodiment has the photo sensor comprising color pixels and distance pixels, the color pixels disposed on a first integrated circuit and the distance pixels disposed on a second integrated circuit. A further exemplary embodiment has the one photo sensor comprising color pixels and distance pixels on a single integrated circuit.

A further exemplary embodiment has the control unit comprising an estimation unit for interpolating the at least one integrated signal at a first time with the at least one integrated signal at a second time, wherein the first time is before the reception time of the integrated signal for the other of the plurality of modulation phase offsets, and the second time is after the reception time of the integrated signal for the other of the plurality of modulation phase offsets.

A further exemplary embodiment has the control unit comprising a estimation unit for extrapolating the at least one integrated signal at a current time from the at least one integrated signal at a plurality of previous times, wherein the current time is the reception time of the integrated signal for the other of the plurality of modulation phase offsets.

An exemplary embodiment distance sensor includes a photo sensing array for receiving and integrating signals indicative of electromagnetic energy reflected from a target for a plurality of modulation phase offsets; and a control unit for measuring a plurality of integrated signals at the plurality of modulation phase offsets, estimating at least one integrated signal for at least one of the plurality of modulation phase offsets, respectively, to adjust its reception time relative to an integrated signal for another of the plurality of modulation phase offsets, and determining a distance between the target and receiver in accordance with the estimated at least one signal.

A further exemplary embodiment has the photo sensing array comprising a plurality of pixels for sequentially acquiring signal samples at a plurality of modulation phase offsets. An alternate exemplary embodiment has the photo sensing array comprising: a first sensor for sequentially acquiring signal samples at a plurality of first modulation phase offsets; and a second sensor for sequentially acquiring signal samples at a plurality of second modulation phase offsets, wherein the first and second modulation phase offsets alternate in sequence. An alternate exemplary embodiment has the plurality of modulation phase offsets comprising four equally spaced offsets. A further exemplary embodiment has first, second, third and fourth signals for zero degree, 90 degree, 180 degree and 270 degree phase offsets, respectively, being received and integrated by first, second, third and fourth photo sensing arrays, respectively. An alternate exemplary embodiment has first and third signals for zero degree and 180 degree phase offsets, respectively, are received and integrated by the photo sensing array, and second and fourth signals for 90 degree and 270 degree phase offsets, respectively, are received and integrated by a second photo sensing array. Another alternate exemplary embodiment has first, second, third and fourth signals for zero degree, 90 degree, 180 degree and 270 degree phase offsets, respectively, being received and integrated by the photo sensing array. A further exemplary embodiment has the photo sensing array comprising color pixels and distance pixels, the color pixels disposed on a first integrated circuit and the distance pixels disposed on a second integrated circuit. An alternate further exemplary embodiment has the one photo sensing array comprises color pixels and distance pixels on a single integrated circuit.

A further exemplary embodiment has the control unit comprising an estimation unit for interpolating the at least one integrated signal at a first time with the at least one integrated signal at a second time, wherein the first time is before the reception time of the integrated signal for the other of the plurality of modulation phase offsets, and the second time is after the reception time of the integrated signal for the other of the plurality of modulation phase offsets.

A further exemplary embodiment has the control unit comprising an estimation unit for extrapolating the at least one integrated signal at a current time from the at least one integrated signal at a plurality of previous times, wherein the current time is the reception time of the integrated signal for the other of the plurality of modulation phase offsets.

A further exemplary embodiment has the photo sensing array comprising: a first integrated circuit for acquiring signal samples for color pixels; and a second integrated circuit for acquiring signal samples for distance pixels.

A further exemplary embodiment has the photo sensing array comprising: a first integrated circuit for acquiring signal samples for color and distance pixels.

The present disclosure may be further understood from the following description of exemplary embodiments, which is to be read in connection with the accompanying drawings.

BRIEF DESCRIPTION OF THE DRAWINGS

The present disclosure provides contactless three-dimensional shape measurement using delay compensation in modulated optical time-of-flight phase estimation in accordance with the following exemplary figures, in which:

FIG. 15 is a graphical diagram of a 2-tap comparative simulation graph in accordance with an exemplary embodiment of the present disclosure;

DETAILED DESCRIPTION OF PREFERRED EMBODIMENTS

Figure 1:
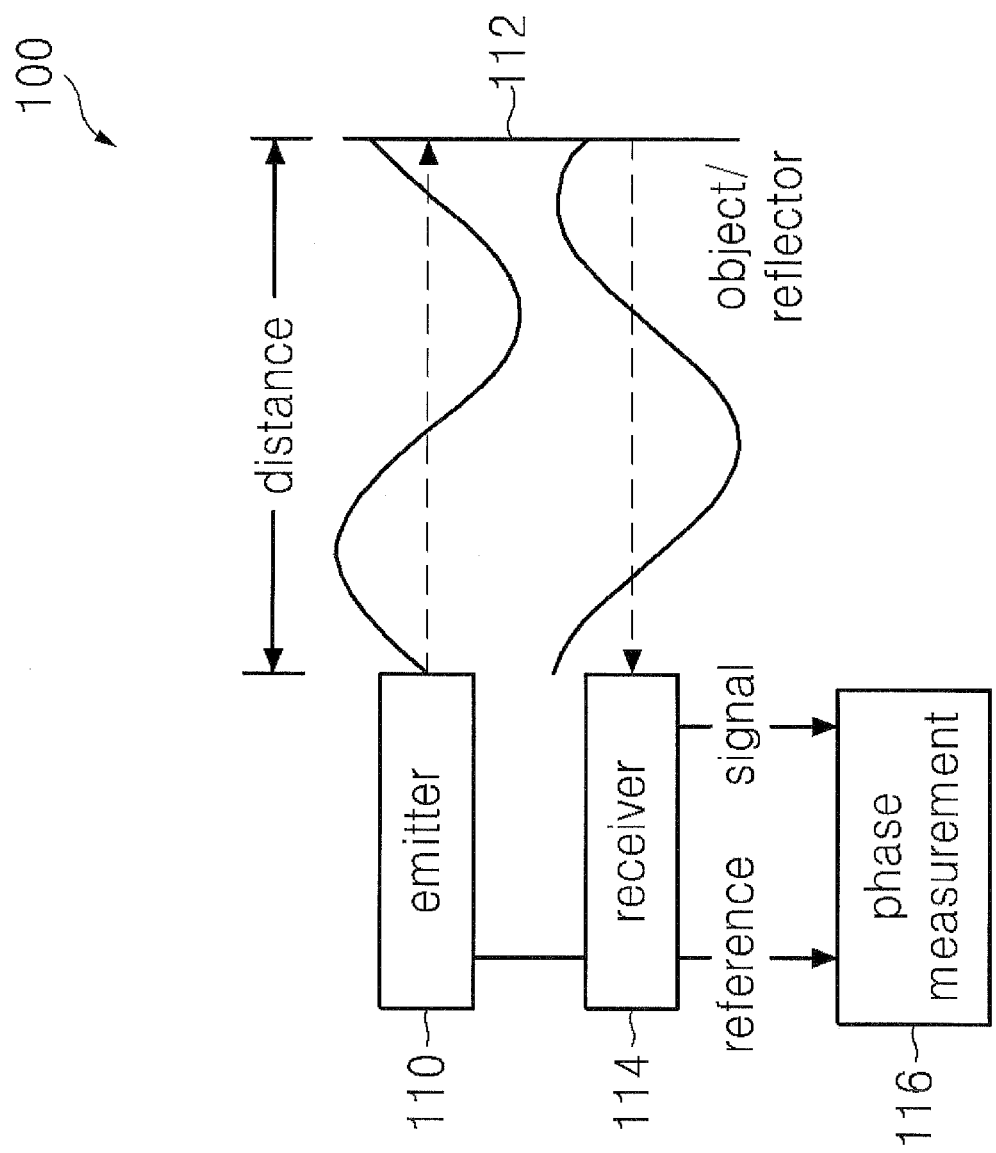
FIG. 1 is a schematic diagram of a contactless 3D shape measurement system in accordance with an exemplary embodiment of the present disclosure.

Preferred embodiment contactless three-dimensional (3D) shape measurement methods and devices perform depth detection using modulated continuous-wave (CW) optical incoherent time-of-flight (TOF) measurements, and feature delay compensation in TOF phase estimation.

Referring to Table A, Equations A1, A2, A3 and A4 represent return signal amplitudes between an emissive sensor and an object. Here, the amplitudes for each of four phase offsets is comprised of a background noise component, alpha, and a reflected signal component, beta. The reflected signal component, beta, indicates an intensity that may vary with distance and reflectivity of the target, for example.

Equation A5 defines the time-of-flight as a function of the distance to and from the target divided by the sped of light. Equation A6 defines an integration or summation for each amplitude by intervals T-int. Equation A7 defines the phase delay estimation. Equation A8 defines the depth estimation.

Referring now to Table B, Equation B1 defines a proportionality for the intensity of an emitted signal from an infrared source. Equation B2 defines the intensity of an emitted signal from an optical source. Equation B3 defines the intensity of the received signal. Equation B4 defines an angle as a function of four phase-offset sampling points. Equation B5 defines the luminosity as a function of the angle. Equation B6 defines a change in luminosity as proportional to a function of brightness and amplitude.

In operation, three-dimensional (3D) time-of-flight (TOF) imaging may use an invisible light source to illuminate a subject. A sensor chip can measure the distance that the light has traveled to reach each pixel within the chip. Embedded imaging software uses a depth map to perceive and identify objects in real time. An associated end-user device can react appropriately to the resulting object identification.

For example, one type of sensor might use a modulation frequency of 44 MHz with a wavelength of 3.4 m, and have a measurement range of about 15 cm to about 3 m with a depth resolution of under 3 cm. Another type of sensor might have a larger pixel array, use a modulation frequency of 20 MHz with a wavelength of 7.5 m, and have a measurement range of around 15 m, with a depth resolution of about 1.3 cm.

Distance or Z-measuring using a sinusoidal waveform can use a relatively inexpensive light source rather than a laser, and a lower bandwidth amplifier. The measurement is typically repeated to get a 'Z' value by accumulated charge, where Z may be on the order of a wavelength of the emitted light.

A Z-measuring optical system can use a nonlinear Geiger-mode to detect small numbers of photons. Here, the optical system is composed to effectively transfer the reflected light from the object to a detector.

It can be difficult to detect depth information by differential signaling caused by pixel saturation due to background light that is noise. Thus, elimination of a common mode signal by the background signal can help. To prevent pixel saturation, either resetting the CA voltage when it is saturated and/or periodically resetting the voltage may be performed.

Undesired photons generated by background light may decrease the signal-to-noise ratio (SNR). To increase the SNR, the voltage may be calculated by background light during the time that the modulated light is off, and the calculated voltage for the background light may be subtracted from the measured voltage during the time that the modulated light is on or emitting.

High and low sensitivities may be obtained by long and short detection periods, respectively. For increased SNR, a distance value for each image element in the range image is calculated based on each electric charge picked up in synchronization with the specific detection period, and then the range image is constructed.

A delayed phase signal may include two components, namely pixel-wise delay and frame-wise delay. Of these, the pixel-wise delay is more significant. Pixel-wise delay is the delay between the 0, 90, 180, and 270 degree components.

Referring to Table C, a 2-tap structure has two sampling times to obtain the four measurements, where the second sampling time is defined by Equation C1. Here, the phase angle is defined by Equation C2. A 4-tap structure has four sampling times to obtain the four measurements, each offset by a time interval. Here, the phase angle is defined by Equation C3. Frame-wise delay is the delay between the first pixel and the last pixel captured with a rolling shutter.

Thus, the numbers of photons captured at actual sampling times may be interpolated or extrapolated to a compensated sampling time by using sensors activated by photogates for a desired phase offset range of a cycle or period, where the desired phase offset range is summed or integrated over many cycles to capture sufficient numbers of photons. In addition, a single correlated double sampling may be performed after such integration over many cycles. Although sensors configured for a typical 2×2 Bayer or like mosaic pattern are sufficient, striped and/or other patterns such as 2×4 and 3×3 may be implemented in alternate embodiments. Similarly, complement colors such as yellow, cyan and magenta may be substituted for the green, blue and red of the Bayer pattern. An emitted wavelength of about 850 to about 950 nm is preferred for outdoor sensing, since the sun has a lower output at 850 nm, yet such wavelengths are just outside of normal human vision in the near infrared band.

As shown in FIG. 1, a contactless 3D shape measurement system is indicated generally by the reference numeral 100. The contactless 3D shape measurement device 100 uses depth compensation for modulated optical time-of-flight phase estimation, and includes an emitter 110, an object or reflector 112 some distance from the emitter, a receiver 114 some distance from the object, and a phase measurement unit 116 in signal communication with the receiver, where the receiver provides a reference and a signal to the phase measurement unit.

Figure 2:
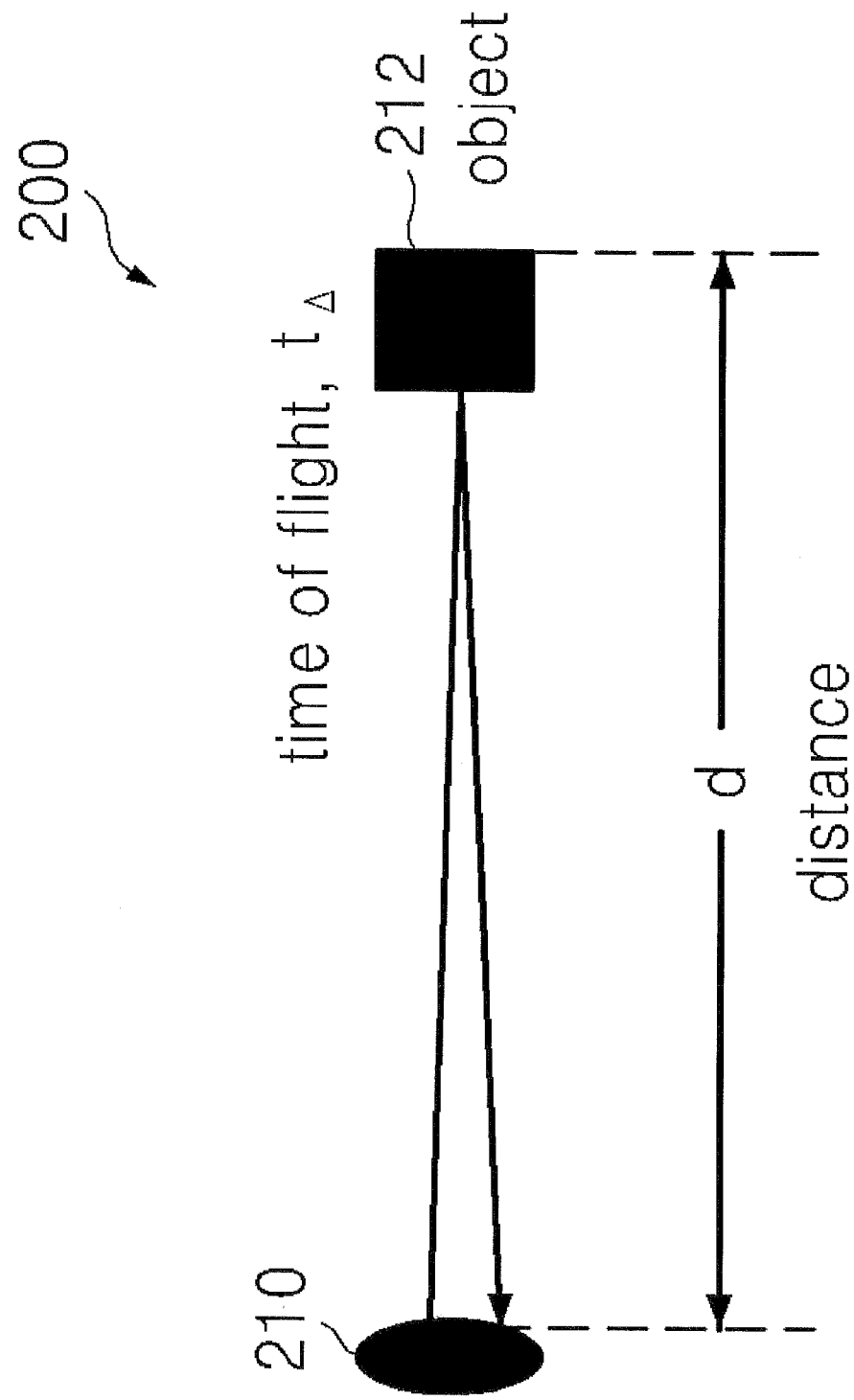
FIG. 2 is a schematic diagram of another contactless 3D shape measurement device in accordance with an exemplary embodiment of the present disclosure.

Turning to FIG. 2, another contactless 3D shape measurement device is indicated generally by the reference numeral 200. Here, a combined emitter/receiver 210 is disposed a distance from an object 212. The time of flight is the time taken for the light to travel from the emitter to the reflector to the receiver.

Figure 3:
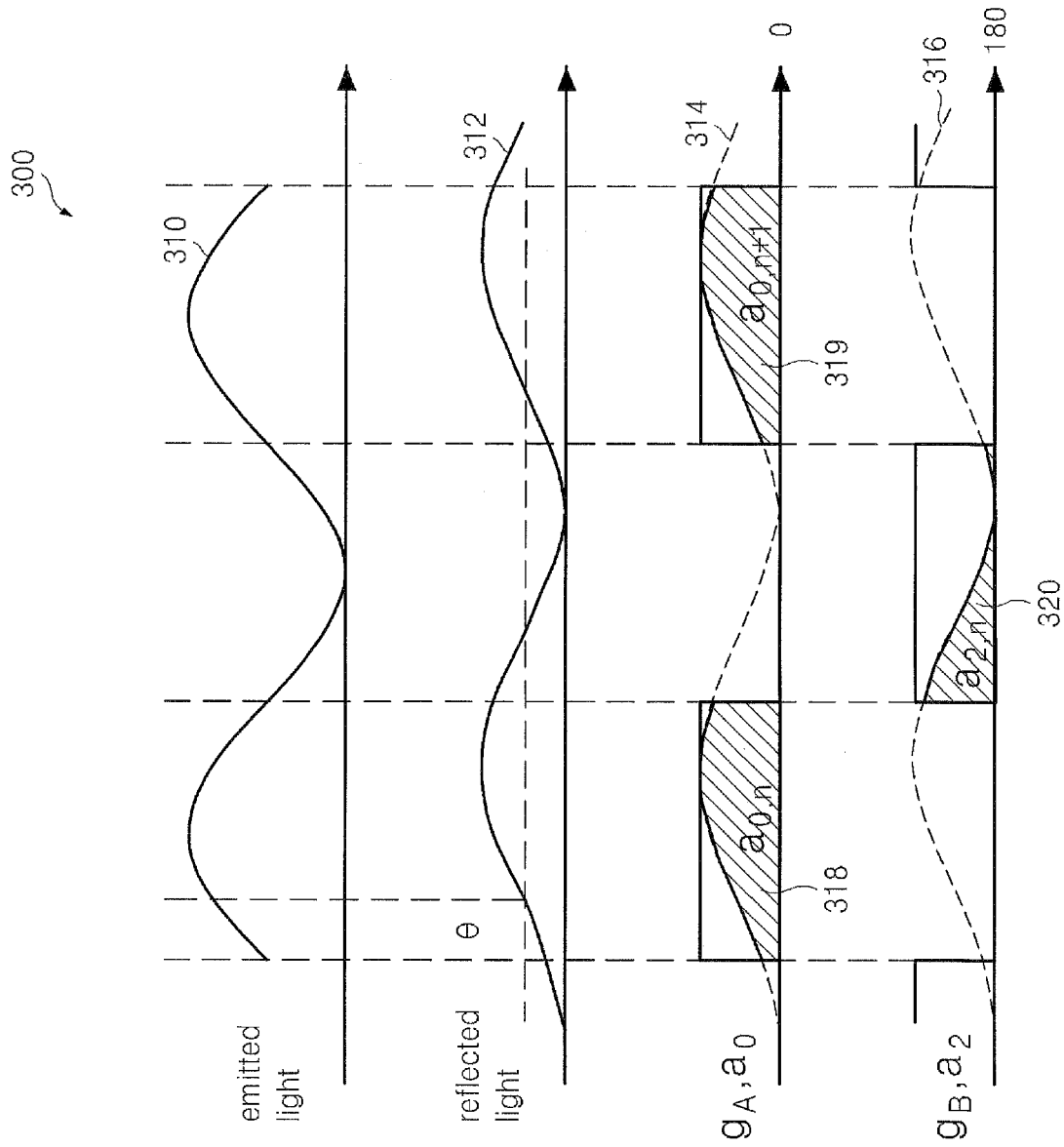
FIG. 3 is a graphical diagram of a signal plot in accordance with an exemplary embodiment of the present disclosure.

Turning now to FIG. 3, a signal plot is indicated generally by the reference numeral 300. The plot 300 includes an emitted light signal 310, a reflected or received light signal 312, a 0-degree phase-offset signal 314, and a 180-degree phase offset signal 316. Here, the 0-degree phase-offset signal 314 includes a $0^{th}$ quadrant $n^{th}$ cycle integral 318 and a $0^{th}$ quadrant $(n+1)^{th}$ cycle integral 319. Similarly, the 180-degree phase-offset signal 316 includes a $2^{nd}$ quadrant $n^{th}$ cycle integral 320 and a $2^{nd}$ quadrant $(n+1)^{th}$ cycle integral.

Figure 4:
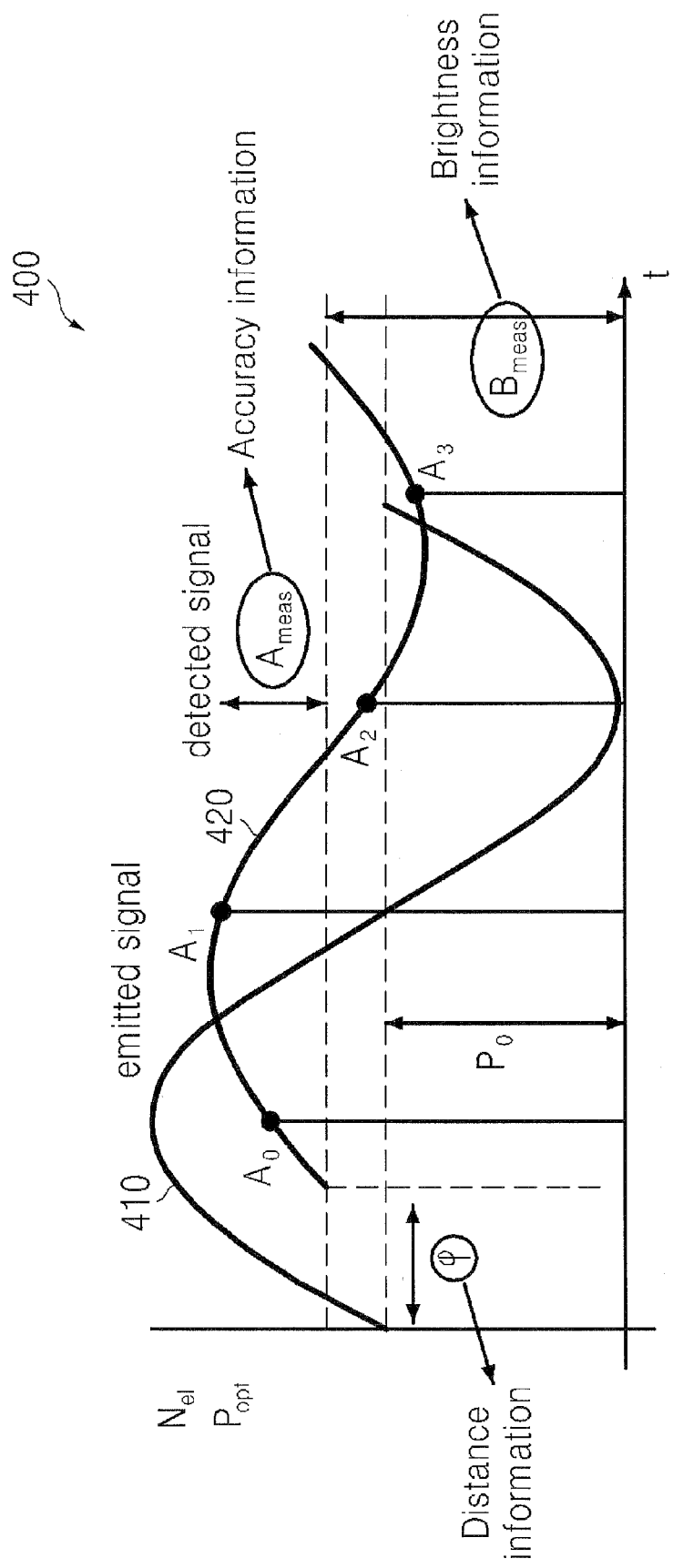
FIG. 4 is a graphical diagram of another signal plot in accordance with an exemplary embodiment of the present disclosure.

As shown in FIG. 4, another signal plot is indicated generally by the reference numeral 400. The plot 400 includes an emitted light signal 410, and a detected signal 420. Here, a phase delay angle between the emitted and detected signals may be used to provide distance information; an alternating-current (AC) or time-varying amplitude of the detected signal may be used to provide accuracy information; and a direct-current (DC) or constant amplitude of the detected signal may be used to provide brightness information.

Figure 5:
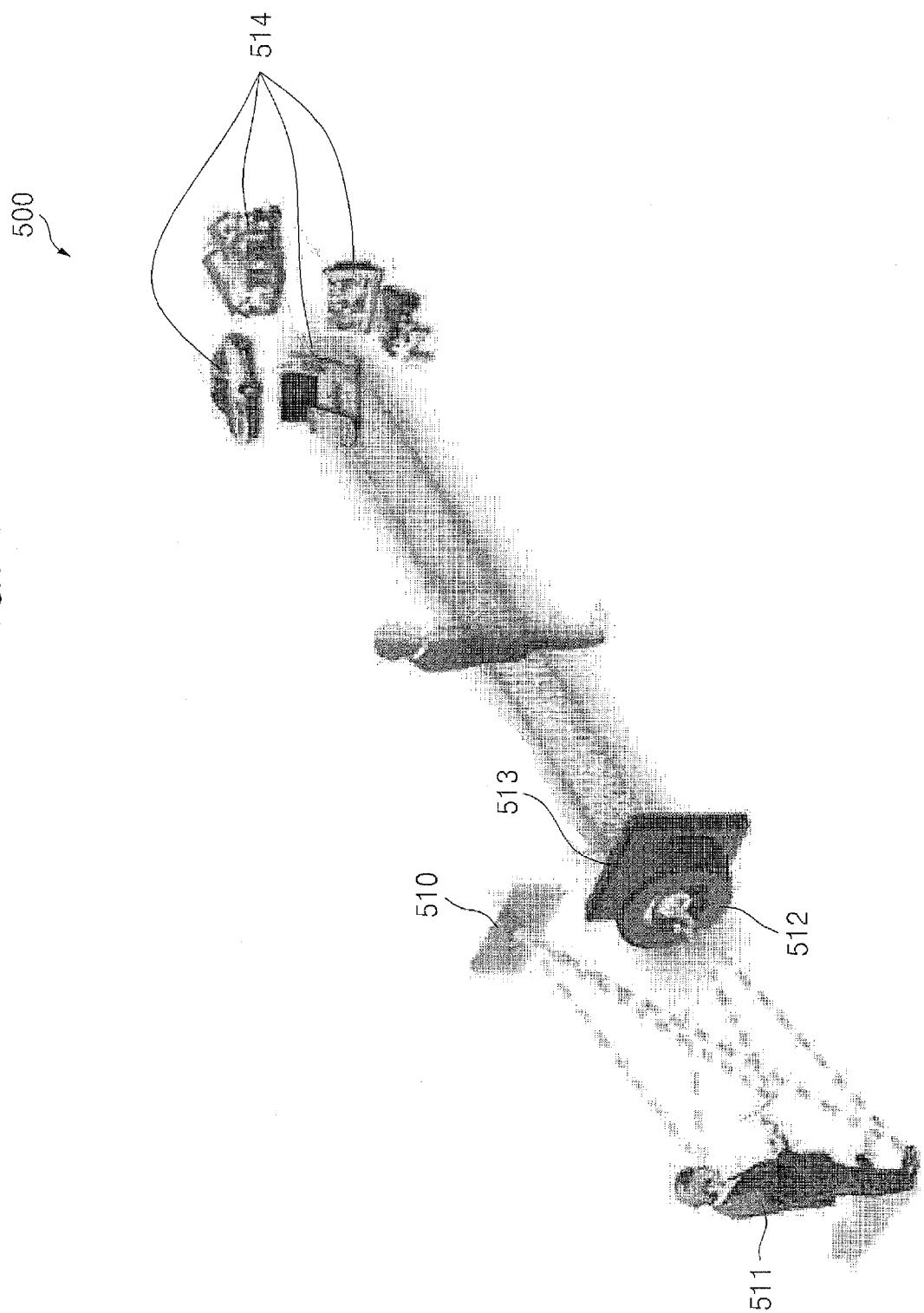
FIG. 5 is a schematic diagram of a contactless 3D shape measurement system in accordance with an exemplary embodiment of the present disclosure.

Turning to FIG. 5, a contactless 3D shape measurement system is indicated generally by the reference numeral 500. The system 500 includes an invisible light source 510 that illuminates a subject 511, a sensor chip 512 that measures the distance light travels to each pixel within the chip from the subject and the source, an embedded imaging unit 513 that comprises a depth map to perceive and identify the subject in real time, and an end-user device 514 in signal communication with the imaging unit for responding to the perceived subject.

Figure 6:
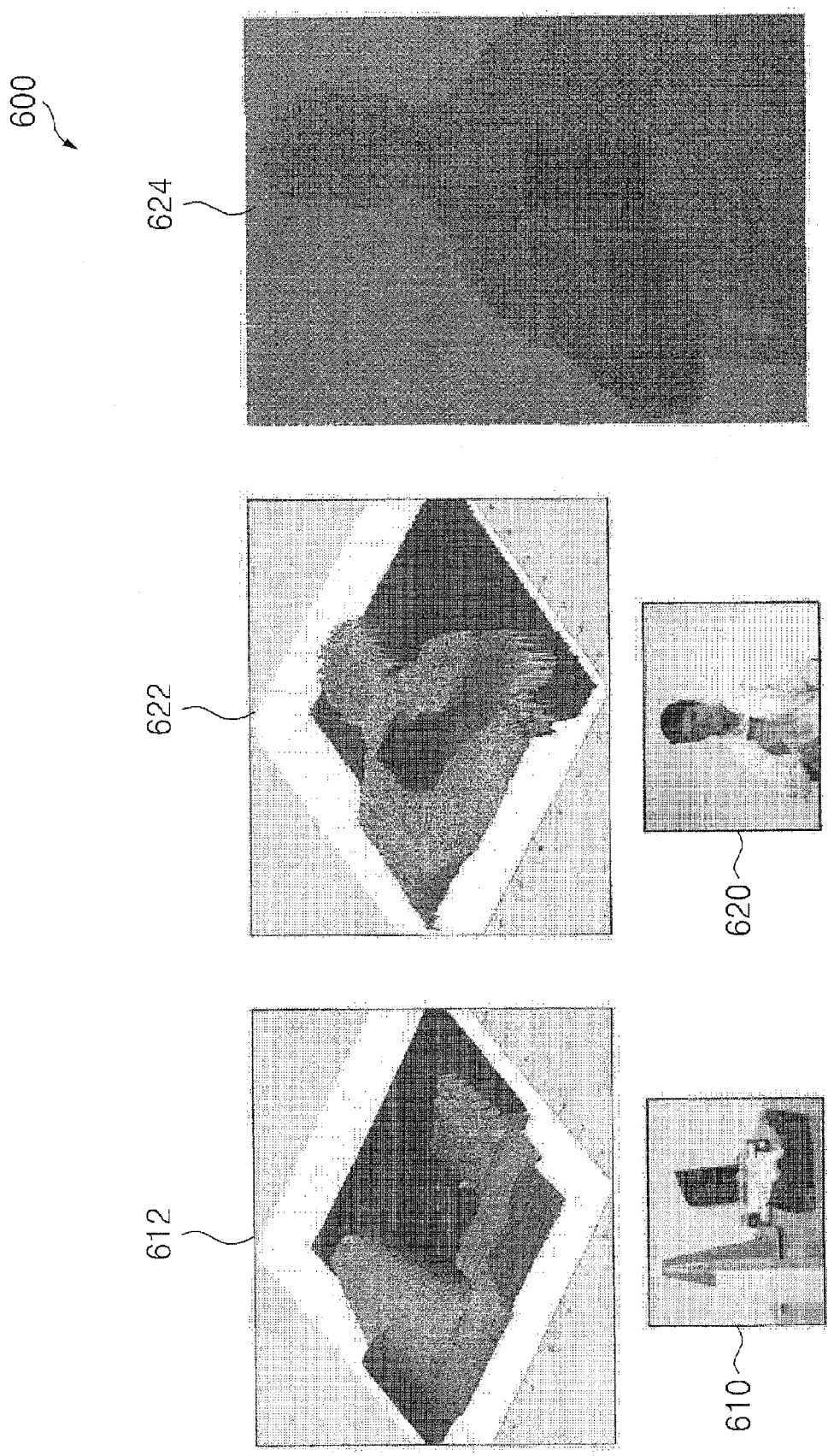
FIG. 6 is a schematic diagram of images from a contactless 3D shape measurement system in accordance with an exemplary embodiment of the present disclosure.

Turning now to FIG. 6, images from a contactless 3D shape measurement system are indicated generally by the reference numeral 600. Here, an imaging unit such as the imaging unit 513 of FIG. 5 perceives a scene 610 as the depth map 612, and perceives the scene 620 as the depth map 622. In this case, the depth map 622 sufficiently matches a reference map 624, indicating that a subject is holding a recognized object, such as a coffee cup.

Figure 7:
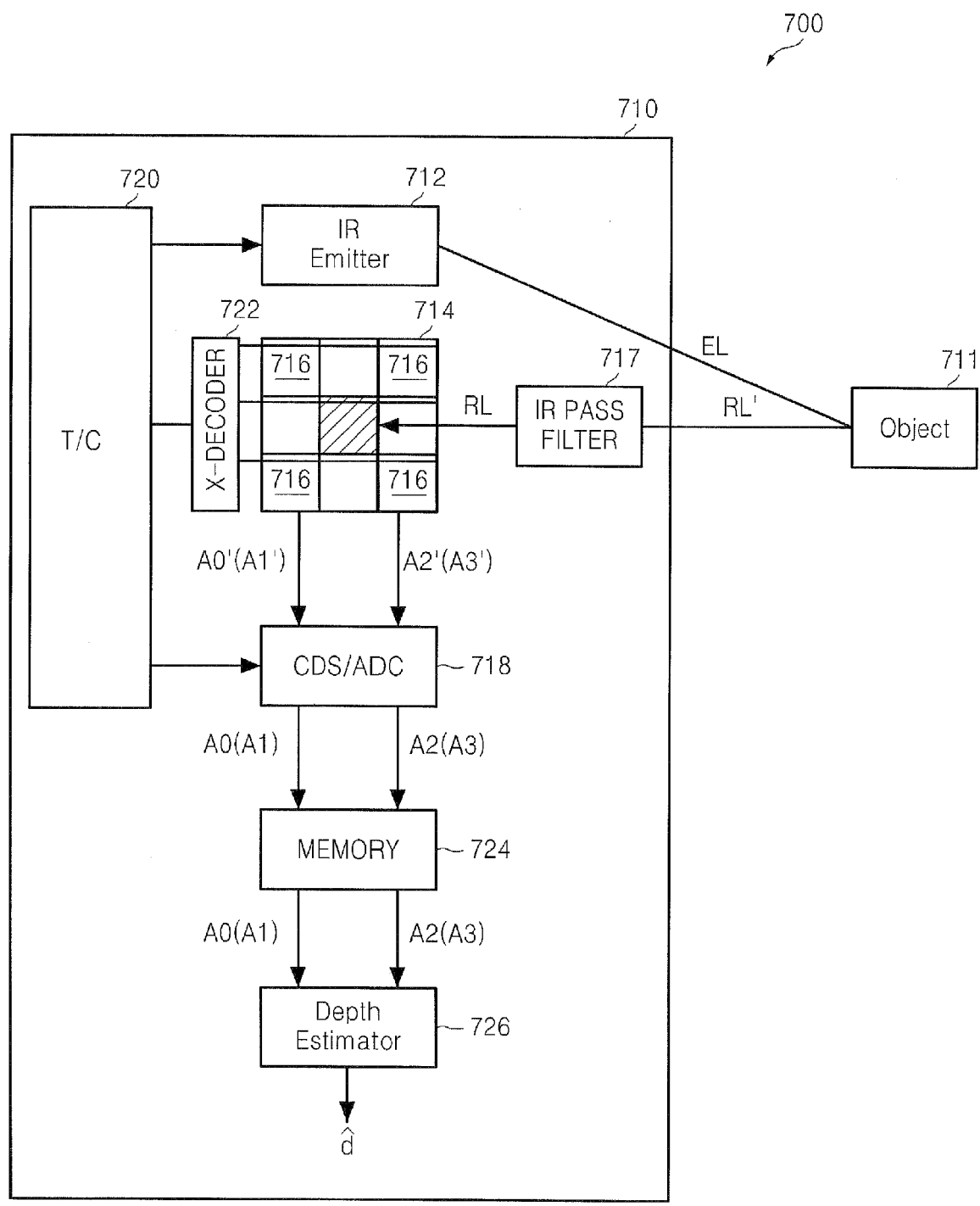
FIG. 7 is a schematic diagram of a 2-tap contactless 3D shape measurement system in accordance with an exemplary embodiment of the present disclosure.

As shown in FIG. 7, a 2-tap contactless 3D shape measurement system is indicated generally by the reference numeral 700. The system 700 includes a device 710 and an object 711. The device 710 includes an infra-red (IR) emitter 712, a sensor array 714 including a plurality of sensor pixels 716, which each receive reflected light from the object through an IR pass filter 717, a correlated double sampling analog-to-digital converter (CDS/ADC) unit 718 that receives amplitudes or photon counts from the array, and a timing and control signal from a timing and control (T/C) unit 720. The T/C unit is also in signal communication with an X-decoder 722 for the array 714, and the IR emitter 712. The CDS/ADC unit 718 passes sampled amplitudes or photon counts to a memory 724, which, in turn, provides the sampled amplitudes or photon counts to a depth estimator 726. The depth estimator 726 provides signals indicative of object depth or distance from the emitter and sensor pixels of the device 710.

In operation of this exemplary embodiment 2-tap structure, the depth sensor 710, object 711, one or more IR emitters 712, 2-tap depth sensor array 714, sensing pixels 716, IR pass filter 717, CDS/ADC unit 718, timing controller 720, memory 724 and depth estimator 726 form an effective system.

Referring to Table E, Equation 1, t-delta is the time difference between the emitted light (EL) and reflected light (RL) where d is depth information, distance between sensor and objects, and c is the speed of light. The RL can pass through the additional lens or lens module located in front of the IR pass filter 717. The IR emitter 712 may emit modulated IR toward the outside and can be configured with light emitting diodes (LEDs), organic light emitting diodes (OLEDs), or laser diodes (LDs), for example.

Each depth sensing pixel 716 having this 2-tap pixel structure can measure pixel signals A0'/A2' and A1'/A3' in accordance with gate signals Ga and Gb, respectively, which have a 180-degree phase difference.

Thus, a plurality of sensing pixels 716 accumulate RL comprising photo-generated electrons introduced by reflected IR incident through the IR pass filter 717 for a predetermined time period, such as a pre-defined integration time, and output pixel signals A0'/A2' and A1'/A3' generated by the accumulation.

In Table E, Equation E2 represents pixel signals A0'/A2' and A1'/A3' generated by each pixel 716. Ak' is derived from the phase difference of the gate signal. When it is 0 degrees, this yields k0; 90 degrees yields k1; 180 degrees yields k2; 270 degrees yields k3, where ak,n is the number of photo-generated electrons in the depth sensor 716 while inputting the nth gate signal with a phase difference according to the 'k', and N=fm*Tint, where fm is the modulated IR or EL, and Tint is the integration time.

Figure 8:
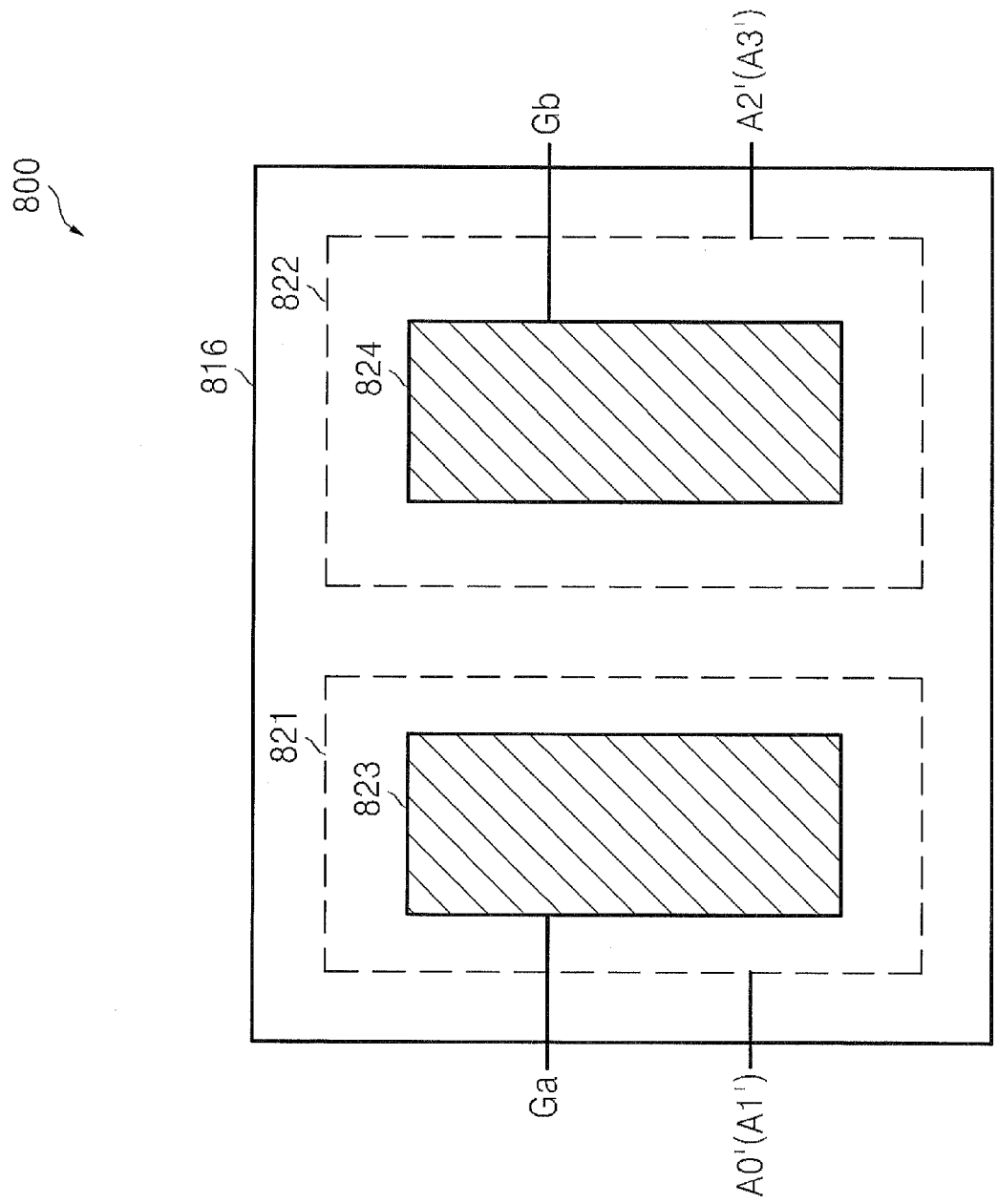
FIG. 8 is a schematic diagram of a 2-tap pixel unit in accordance with an exemplary embodiment of the present disclosure.

Turning to FIG. 8, a 2-tap pixel unit is indicated generally by the reference numeral 800. The pixel unit includes a pixel 816, such as one of the pixels 716 of FIG. 7. The pixel includes a first region 821 and a second region 822. The first region includes a first tap 823, and the second region includes a second tap 824.

Figure 9:
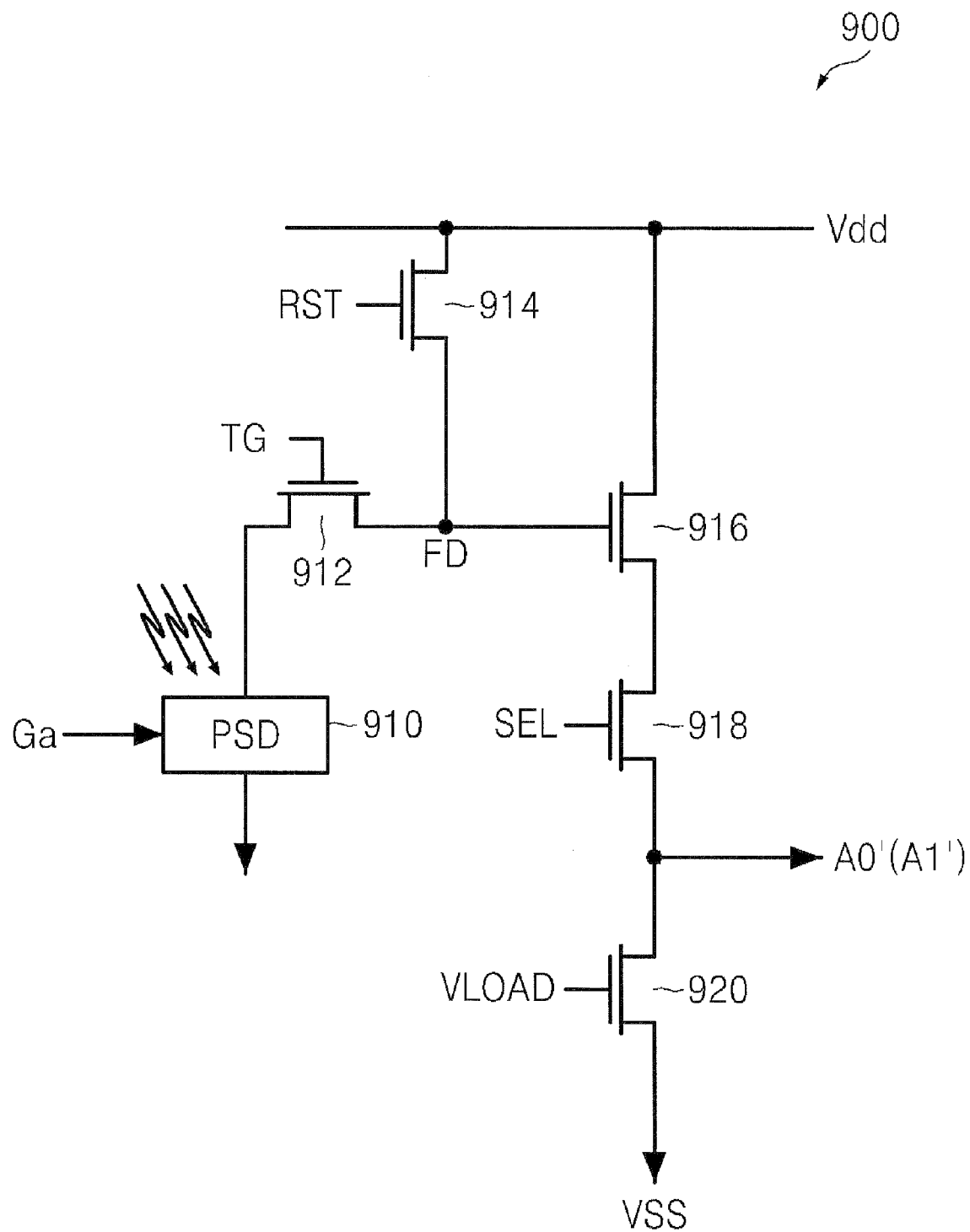
FIG. 9 is a circuit diagram of a pixel sensor circuit in accordance with an exemplary embodiment of the present disclosure.

Turning now to FIG. 9, a pixel sensor circuit is indicated generally by the reference numeral 900. The circuit includes a photo-sensor device (PSD) 910 for receiving photons, a gate transistor 912 connected to the PSD, a reset transistor 914 connected between the gate transistor and a source voltage, a second transistor 916 gated by the gate transistor and connected between the source voltage and a select transistor 918, and a load transistor 920 connected between the select transistor and ground. Thus, the pixel sensor circuit includes transistors and photo-electric converting devices in active areas 821 and 822 of FIG. 8.

Figure 10:
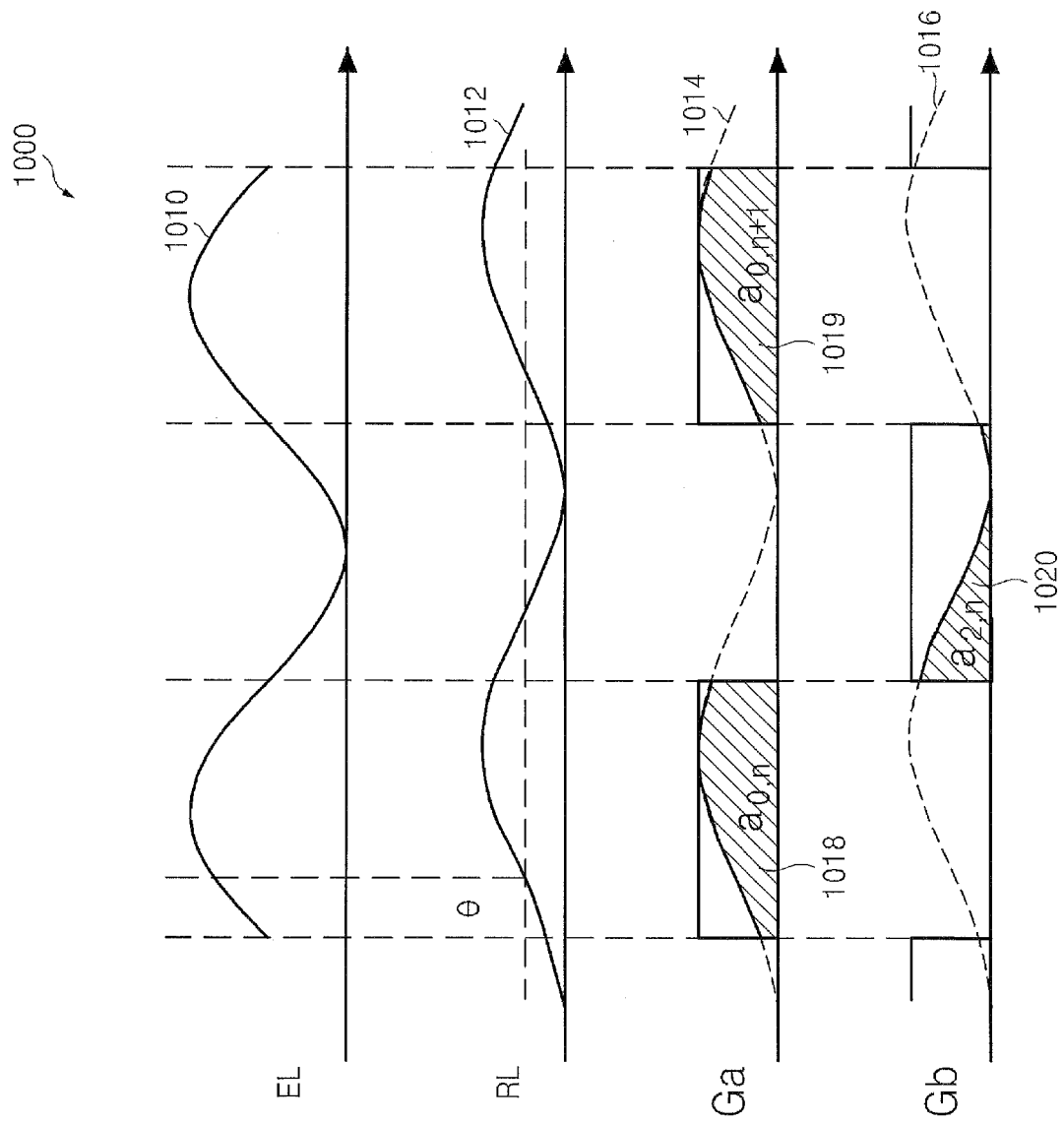
FIG. 10 is a graphical diagram of a 2-tap signal plot and timing diagram of IR signals and gate signals in accordance with an exemplary embodiment of the present disclosure.

As shown in FIG. 10, a 2-tap signal plot and timing diagram of IR signals and gate signals is indicated generally by the reference numeral 1000. The plot 1000 includes an emitted light signal 1010, a reflected or received light signal 1012, a 0-degree phase-offset signal 1014, and a 180-degree phase offset signal 1016. Here, the 0-degree phase-offset signal 1014 includes a $0^{th}$ quadrant $n^{th}$ cycle integral 1018 and a $0^{th}$ quadrant $(n+1)^{th}$ cycle integral 1019. Similarly, the 180-degree phase-offset signal 1016 includes a $2^{nd}$ quadrant $n^{th}$ cycle integral 1020 and a $2^{nd}$ quadrant $(n+1)^{th}$ cycle integral.

In operation of the 2-tap sensor of FIGS. 8, 9 and 10 uses gate signals Ga and Gb, which have a phase difference of 180 degrees, and which are supplied for each photo-electric converting device including photogates 823 and 824 of the depth sensing pixel 816 of FIG. 8.

Therefore, each photogate transfers the photo-generated electrons generated by the reflected light (RL) to the floating diffusion (FD) region through the transfer gate 912 of FIG. 9 during the high times of Ga and Gb. Each pixel signal A0'/A2' and A1'/A3' corresponding to photo-generated electrons is generated by respective photo-electric converting devices 823 and 824 through the source follower transistor 916 and the select transistor 918. The reset transistor 914 resets FD to Vdd in accordance with a reset signal (RST).

The load transistor 920 is connected between the output node of the depth sensing pixel and ground, and operates by following a load signal VLOAD. Upon the signal of the timing controller 720 of FIG. 7, the digital CDS/ADC circuit 718 executes correlated double sampling and ADC for each pixel signal A0'/A2' and A1'/A3', and outputs each digital pixel signal A0/A2 and A1/A3.

Figure 11:
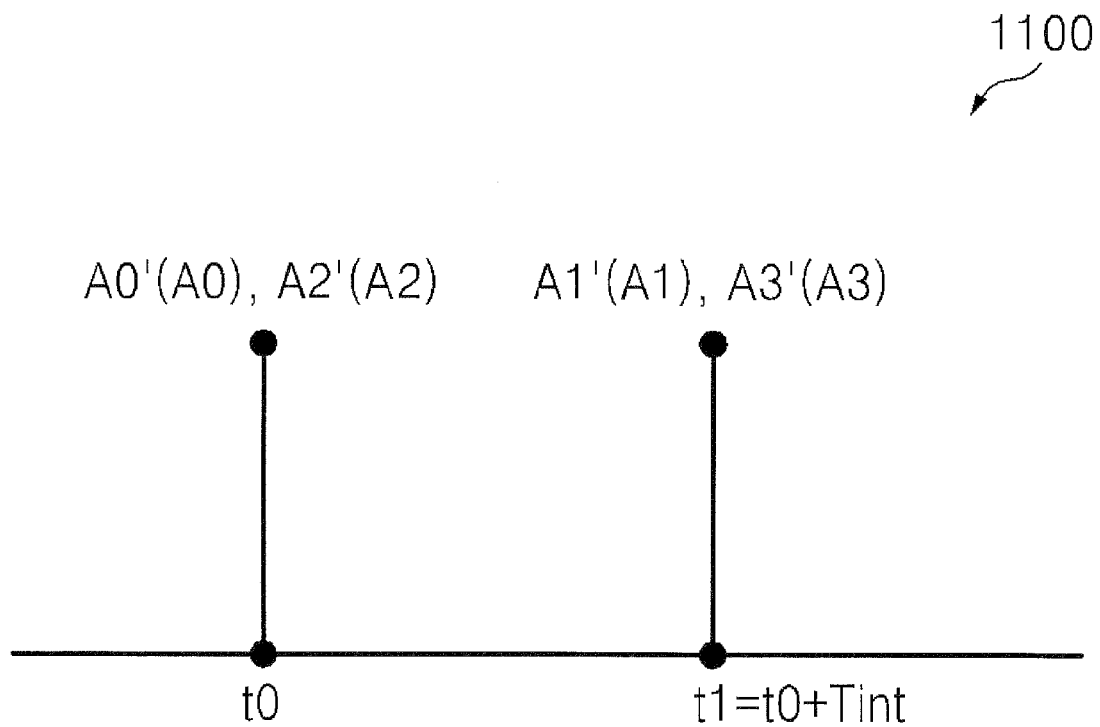
FIG. 11 is a graphical diagram of a 2-tap sampling point plot in accordance with an exemplary embodiment of the present disclosure.

Turning to FIG. 11, a 2-tap sampling point plot is indicated generally by the reference numeral 1100. The plot 1100 shows two sampling points, t0 and t1. At the first sampling point t0, the zeroth and second phase-offset quadrant photon counts are sampled. At the second sampling point t1, the first and third phase-offset quadrant photon counts are sampled.

In operation, the memory 724 of FIG. 7, configured by buffers, receives and stores each digital pixel signal A0/A2 and A1/A3 outputted from the CDS/ADC circuit 718. The depth estimator 726 estimates phase differences based on each digital pixel signal A0/A2 and A1/A3. The phase difference estimated by the depth estimator 726 is defined by Table E, Equation E3.

The depth estimator 726 estimates depth information based on estimated phase differences in accordance with equation E4, where c is the velocity of light, and fm is the modulated frequency of reflected light (RL), and outputs depth information.

The timing diagram illustrates the time difference generated in depth sensing pixels having the 2-tap pixel structure, as set forth in Equation E5. If gate signals Ga and Gb, which each has a phase offset of about 0 degrees and 180 degrees, respectively, are input at t0, then depth sensing pixels 716 having the 2-tap pixel structure output simultaneously measured pixel signals A0' and A2'. In addition, if the gate signals, which each have a phase offset of about 90 degrees and 270 degrees, respectively, are input at time t1, then depth sensing pixels 716 having the 2-tap pixel structure output simultaneously measured pixel signals A1' and A3'. Thus, the depth sensing pixels 716 each measure pixel signals twice in each time interval Tint, since the depth sensing pixels 716 do not measure each pixel signal A1', A2', A3' or A4' at the same time.

The depth estimator 726 estimates the phase difference based on each digital pixel signal A0, A1, A2, and A3 according to Equation E5. The depth estimator 726 estimates depth information based on estimated phase differences and outputs depth information, d-hat.

Figure 12:
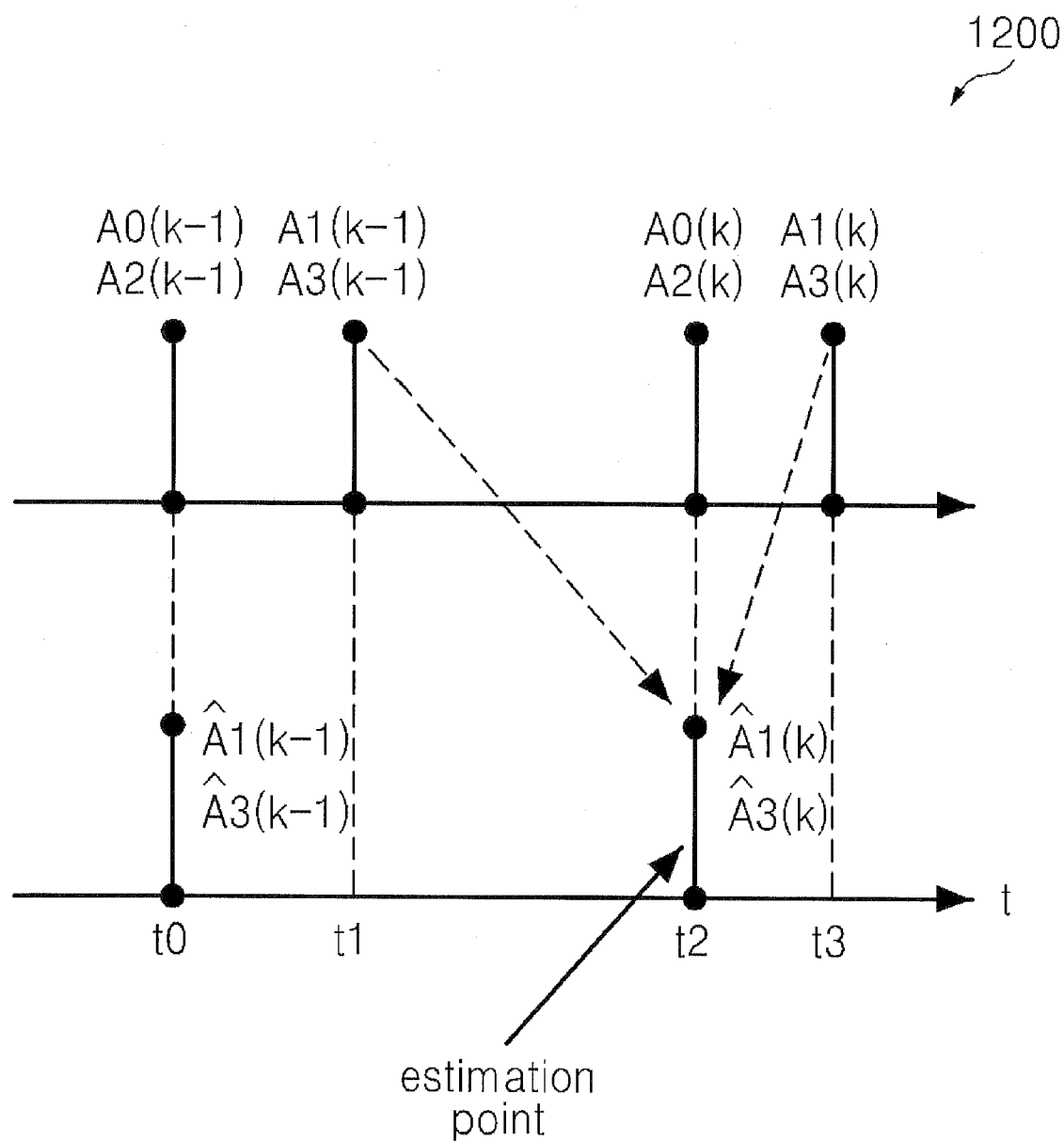
FIG. 12 is a graphical diagram of another 2-tap sampling point plot in accordance with an exemplary embodiment of the present disclosure.

Turning now to FIG. 12, another 2-tap sampling point plot is indicated generally by the reference numeral 1200. The plot 1200 shows two actual sampling points t0 and t2, and two interpolated sampling points t1 and t3.

This conceptual diagram is provided for explaining estimation of digital pixel signals. In the exemplary embodiment of FIG. 7, alternate embodiment depth estimators 726 may be used for compensating the phase error according to the time difference, Tint. For example, the estimator 726 can estimate respective digital signals at estimation time t2 using a plurality of digital pixel signals already measured at the same time t2. Here, the depth sensor 710, including depth sensing pixel 716 having the 2-tap pixel structure, measures respective pixel signals A1'(k−1), A3'(k−1) at time t1 and A0'(k), A2'(k) at time t2, and A1'(k), A3'(k) at time t3.

Each pixel signal A1'(k−1), A3'(k−1), A0'(k), A2'(k), A1'(k), and A3'(k) is converted to a digital signal A(k−1), A3(k−1), A0(k), A2(k), A1(k), and A3(k), and stored in memory 724. Thus, the depth estimator 726 estimates two estimated values according to Equation E6 at time t2.

Here, the background noise may be assumed constant while the object is moving as a function of time. Using the current and past values of the captured signals, A1 and A3, the compensated signals at which A0 and A2 are measured can be estimated. For example, a simple interpolation algorithm may be used. Alternatively, extrapolation may be used in an alternate embodiment.

Referring now to Table D, Equation D1 defines an interpolated measurement as a function of the actual measurements at the two actual sampling points. Equation D2 shows the exemplary simple interpolation used here. Equation D3 calculates the phase angle theta from the interpolated and actual measurements.

If the depth estimator 726 uses a linear interpolation, for example, then it can estimate values using Equation E7. The depth estimator 726 also estimates the remaining estimated values using the same equation. The depth estimator 726 then calculates the phase difference at time t2 using A0(*k*)/A2(*k*) and Equation E8.

Figure 13:
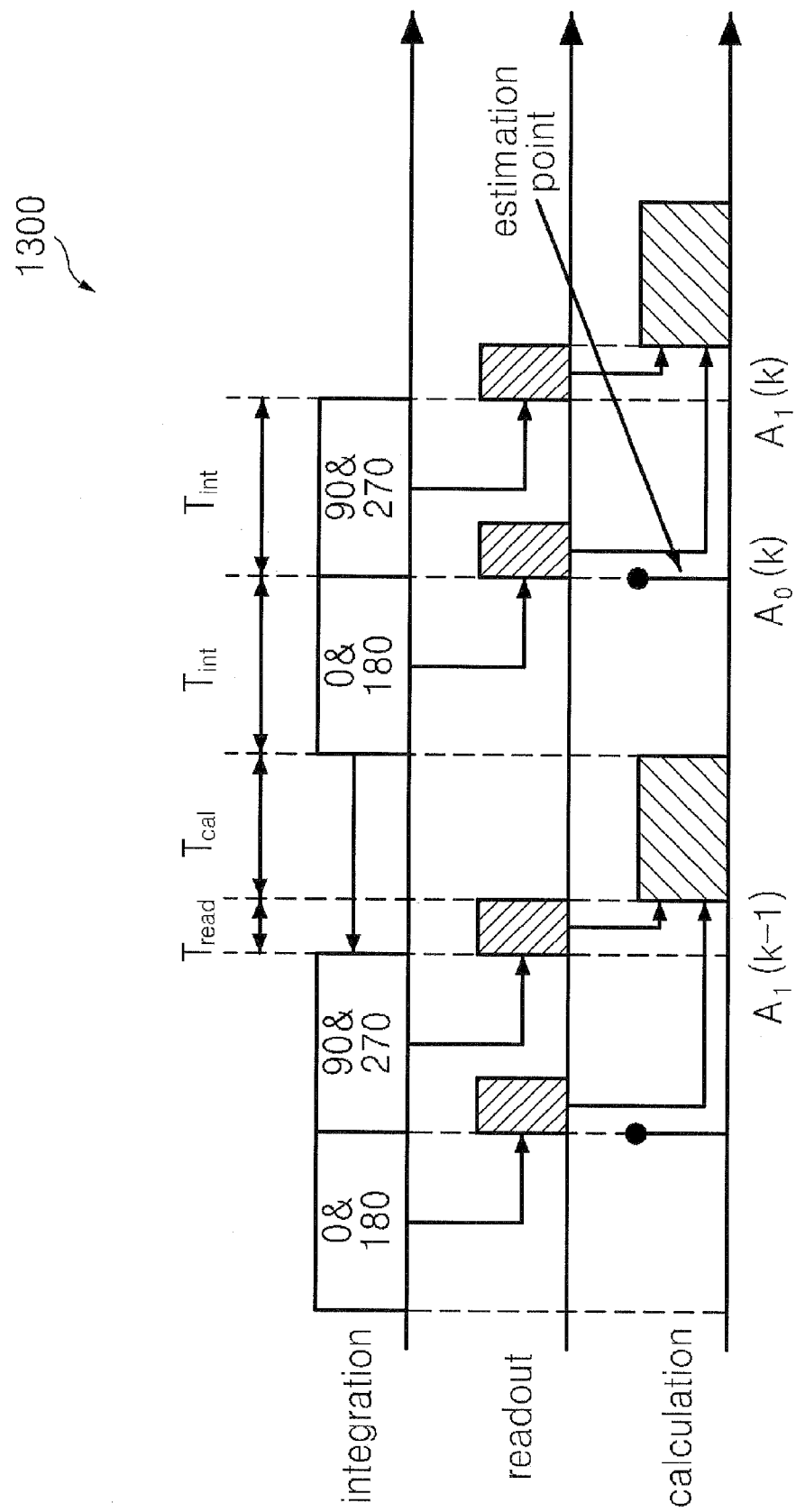
FIG. 13 is a schematic diagram of a 2-tap timing diagram illustrating the estimation process for a digital pixel signal according to the operation of the depth sensor at estimation time in accordance with an exemplary embodiment of the present disclosure.

As shown in FIG. 13, a 2-tap timing diagram illustrating the estimation process for a digital pixel signal according to the operation of the depth sensor at estimation time is indicated generally by the reference numeral 1300. Equation E8 is re-written as Equation E9, where Tint is the integration time, Tread is the readout time from pixel out(Ak') to digital out(Ak), and Tcal is the time that was taken by the depth estimator 726 to calculate or estimate digital pixel signals. The digital pixel signals are provided by the depth estimator 726 according to Equation E10.

Figure 14:
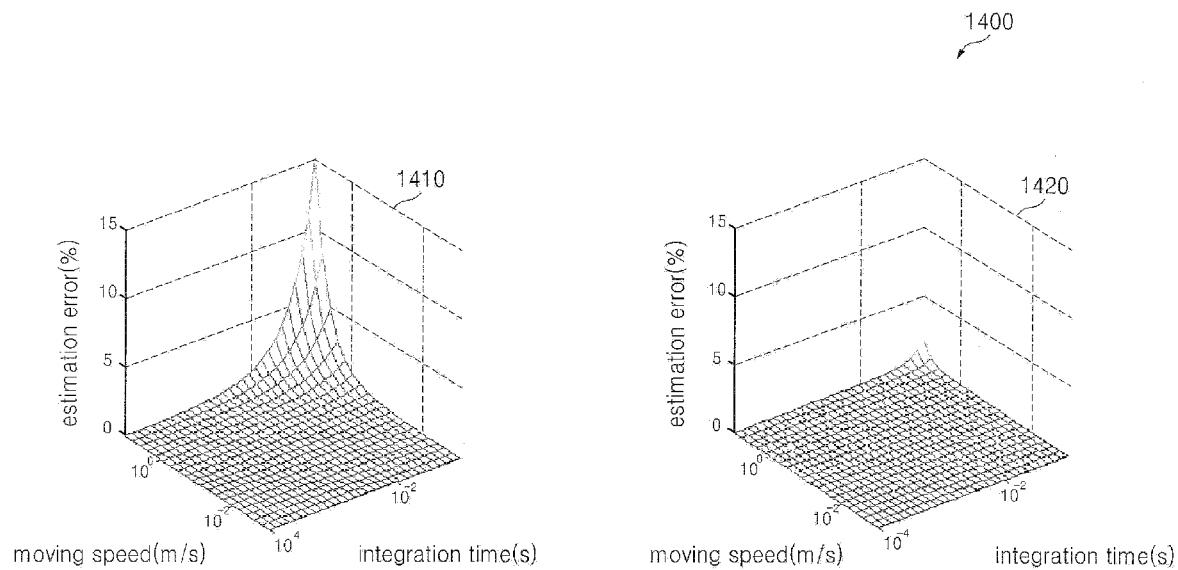
FIG. 14 is a graphical diagram of simulation results for conventional versus a 2-tap embodiment in accordance with an exemplary embodiment of the present disclosure.

Turning to FIG. 14, plots of simulation results are indicated generally by the reference numeral 1400. Here, a simulation graph that represents phase difference calculation error in a case where the object 711 moves at the speed of 1 mm/s~1 m/s is shown in plot 1410, and a simulation graph that represents phase difference calculation error in a case where the object 711 moves at the speed of 1 mm/s~1 m/s, but corrected by linear interpolation according to a preferred embodiment of the present disclosure is shown in plot 1420.

Before compensation, in the case of using a conventional algorithm, the phase difference error that is estimation error increases as the integration time increases and/or the speed of a moving object 711 increases. After compensation, in the case of using an algorithm according to an exemplary embodiment method of the present disclosure, the phase difference calculation error is significantly decreased even if the integration time and/or speed of the object increase.

Turning now to FIG. 15, a 2-tap comparative simulation graph is indicated generally by the reference numeral 1500. Here, the plot 1510 represents the phase difference calculation error of a conventional method, while the plot 1520 represents the phase difference calculation error of an exemplary embodiment of the present disclosure.

Figure 16:
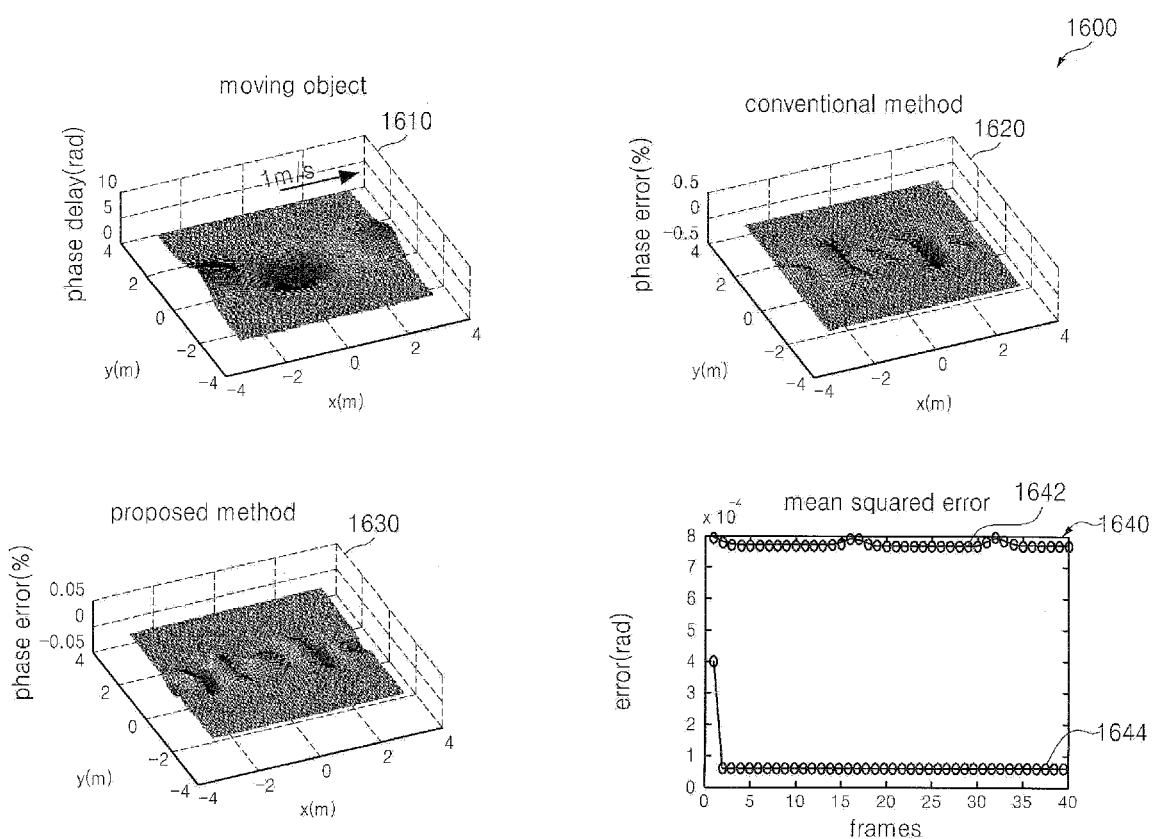
FIG. 16 is a graphical diagram of a 2-tap comparative simulation graphs in accordance with an exemplary embodiment of the present disclosure.

As shown in FIG. 16, 2-tap comparative simulation graphs are indicated generally by the reference numeral 1600. Here, the plot 1610 shows the phase difference calculation error without compensation. The plot 1620 shows the phase difference calculation error with conventional compensation. The plot 1630 shows the phase difference calculation error with compensation in accordance with an exemplary embodiment of the present disclosure. The plot 1640 shows the mean squared error for the conventional method 1642 versus an exemplary embodiment of the present disclosure 1644.

Figure 17:
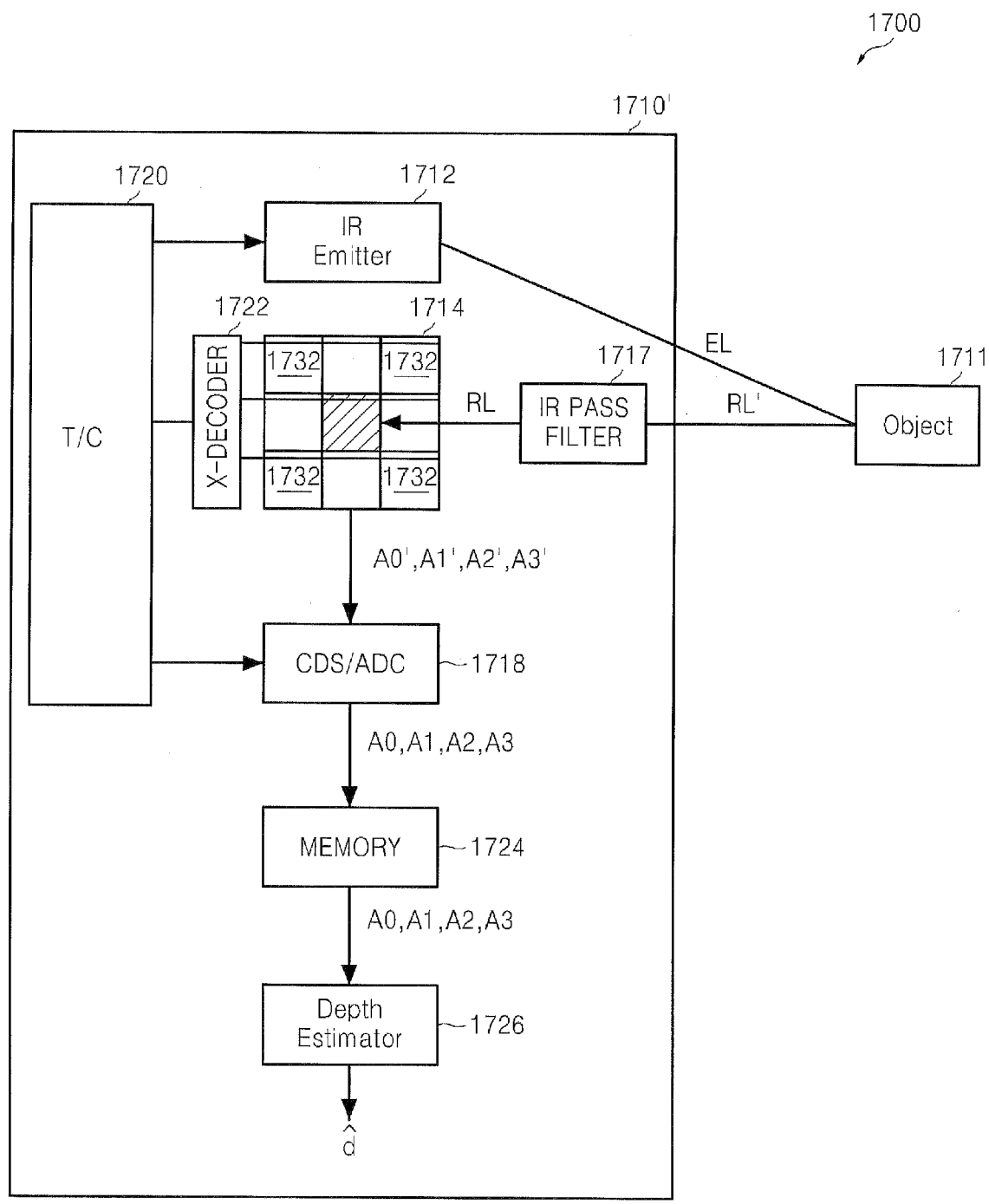
FIG. 17 is a schematic diagram of a 1-tap contactless 3D shape measurement system in accordance with an exemplary embodiment of the present disclosure.

Turning to FIG. 17, a 1-tap contactless 3D shape measurement system is indicated generally by the reference numeral 1700. The system 1700 includes a device 1710 and an object 1711. The device 1710 includes an infra-red (IR) emitter 1712, a sensor array 1714 including a plurality of sensor pixels 1732, which each receive reflected light from the object through an IR pass filter 1717, a correlated double sampling analog-to-digital converter (CDS/ADC) unit 1718 that receives amplitudes or photon counts from the array, and a timing and control signal from a timing and control (T/C) unit 1720. The T/C unit is also in signal communication with an X-decoder 1722 for the array 1714, and the IR emitter 1712. The CDS/ADC unit 1718 passes sampled amplitudes or photon counts to a memory 1724, which, in turn, provides the sampled amplitudes or photon counts to a depth estimator 1726. The depth estimator 1726 provides signals indicative of object depth or distance from the emitter and sensor pixels of the device 1710.

In operation, the depth sensor 1710, object 1711, IR emitters 1712, depth sensor array 1714, sensing pixels 1732, IR pass filter 1717, CDS/ADC 1718, timing controller 1720, memory 1724 and depth estimator 1726 form an effective system. Here, the depth estimator uses Equation E1, where t is the time difference between the emitted light (EL) and the received light (RL), d is the depth information corresponding to the distance between emitter to object(s) to sensor, and c is the speed of light.

The RL can get through the additional lens or lens module located in front of the IR pass filter 1717. The IR Emitter 1712 may emit modulated IR towards the outside, and can be configured with one or more Light Emitting Diodes (LEDs), Organic Light Emitting Diodes (OLEDs), or Laser Diodes (LDs).

Thus, a depth sensing pixel 1732 having a 1-tap pixel structure can measure pixel signals (A0',A1',A2',A3') in accordance with gate signals (Ga,Gb,Gc,Gd) which have 0-degree, 90-degree, 180-degree, 270-degree phase offsets, respectively. Sensing pixels 1732 accumulate photo-generated electrons introduced by reflected IR or RL incident through the IR pass filter 1717 for a predetermined time period, such as during an integration time, and output pixel signals (A0',A1',A2',A3') generated by the accumulations in accordance with Equation E2.

Pixel signals (A0',A1',A2',A3') are generated by each pixel 1732, where Ak' is as follows, When the phase difference or offset of the gate signal is 0-degrees, k is 0. When the phase difference or offset of the gate signal is 90-degrees, k is 1. When the phase difference or offset of the gate signal is 180-degrees, k is 2. When the phase difference or offset of the gate signal is 270-degrees, k is 3.

Here, $a_{k,n}$ is the number of photo-generated electrons in the depth sensor 1732 while inputting the nth gate signal with phase difference according to the 'k'. N=fm*Tint, where fm is the modulated IR or EL, and Tint is the integration time.

Figure 18:
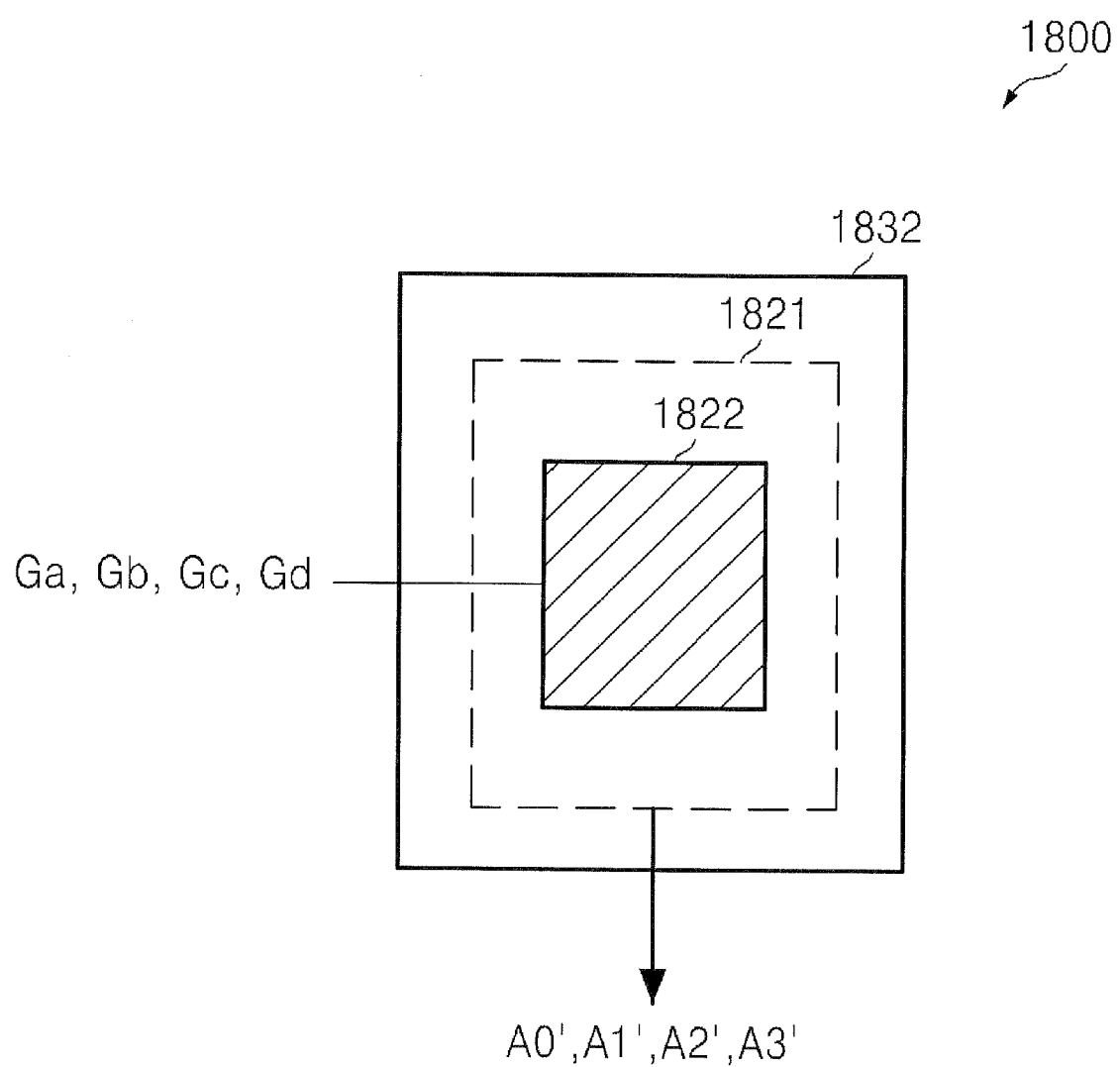
FIG. 18 is a schematic diagram of a 1-tap pixel unit in accordance with an exemplary embodiment of the present disclosure.

Turning now to FIG. 18, a 1-tap pixel unit is indicated generally by the reference numeral 1800. The pixel unit includes a pixel 1832, such as one of the pixels 1732 of FIG. 17. The pixel includes a first region 1821, which includes a first tap 1822.

Figure 19:
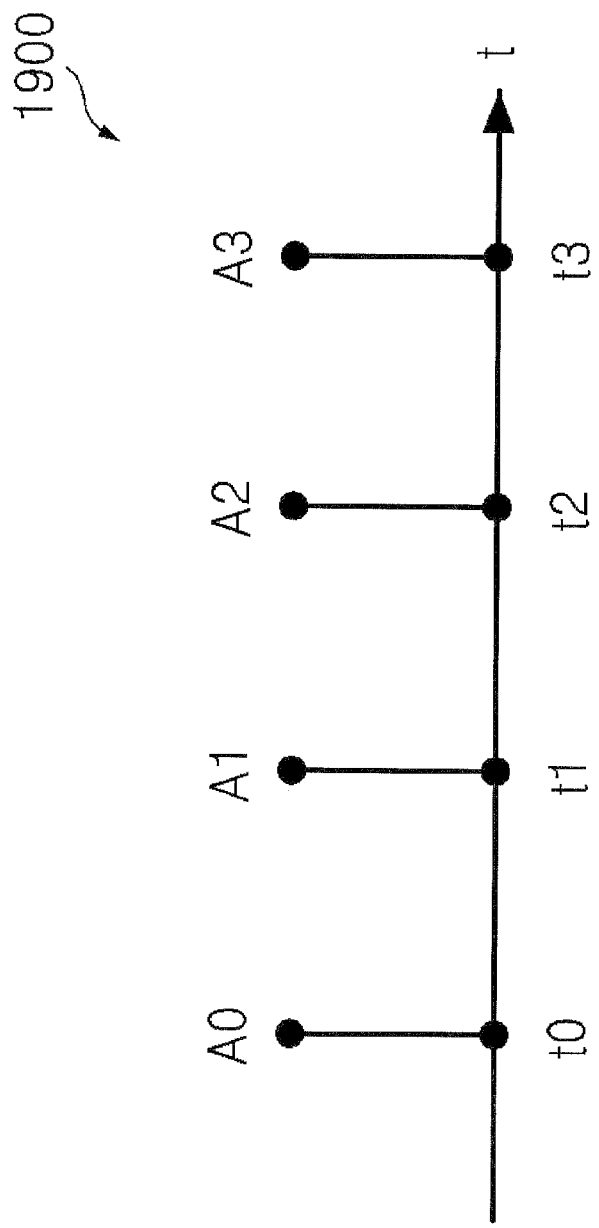
FIG. 19 is a graphical diagram of a 1-tap sampling point plot in accordance with an exemplary embodiment of the present disclosure.

Turning to FIG. 19, a 1-tap sampling point plot is indicated generally by the reference numeral 1900. The plot 1900 shows four sampling points, t0, t1, t2, and t3. At the zeroth sampling point t0, the zeroth phase-offset quadrant photon count is sampled. At the first sampling point t1, the first phase-offset quadrant photon count is sampled. At the second sampling point t2, the second phase-offset quadrant photon count is sampled. At the third sampling point t3, the third phase-offset quadrant photon count is sampled.

In operation of the 1-tap structure of FIGS. 17, 18 and 19, gate signals Ga, Gb, Gc, Gd, which have phase offsets of 0-degree, 90-degree, 180-degree, and 270-degree, respectively, are sequentially applied to the photo-electric converting device or photogate 1822 of the depth sensing pixel 1832, each of FIG. 18. Thus, the photogate 1822 transfers the photo-generated electrons generated by reflected light (RL) to the floating diffusion region (FD) through a transfer gate.

On the signal of the timing controller 1720, the digital CDS/ADC circuit 1718 executes correlated double sampling and analog-to-digital conversion for each pixel signal, including A0' at time t0, A1' at time t1, A2' at time t2, and A3' at time t3, and outputs each digital pixel signal A0, A1, A2, and A3. The memory 1724, which is configured as buffers, receives and stores each digital pixel signal A0, A1, A2, and A3 outputted from the CDS/ADC circuit 1718.

The depth estimator 1726, in turn, calculates the phase difference based on each digital pixel signal A0, A1, A2, and A3. The phase difference estimated by the depth estimator 1726 is derived from Equation F4 of Table F.

Figure 20:
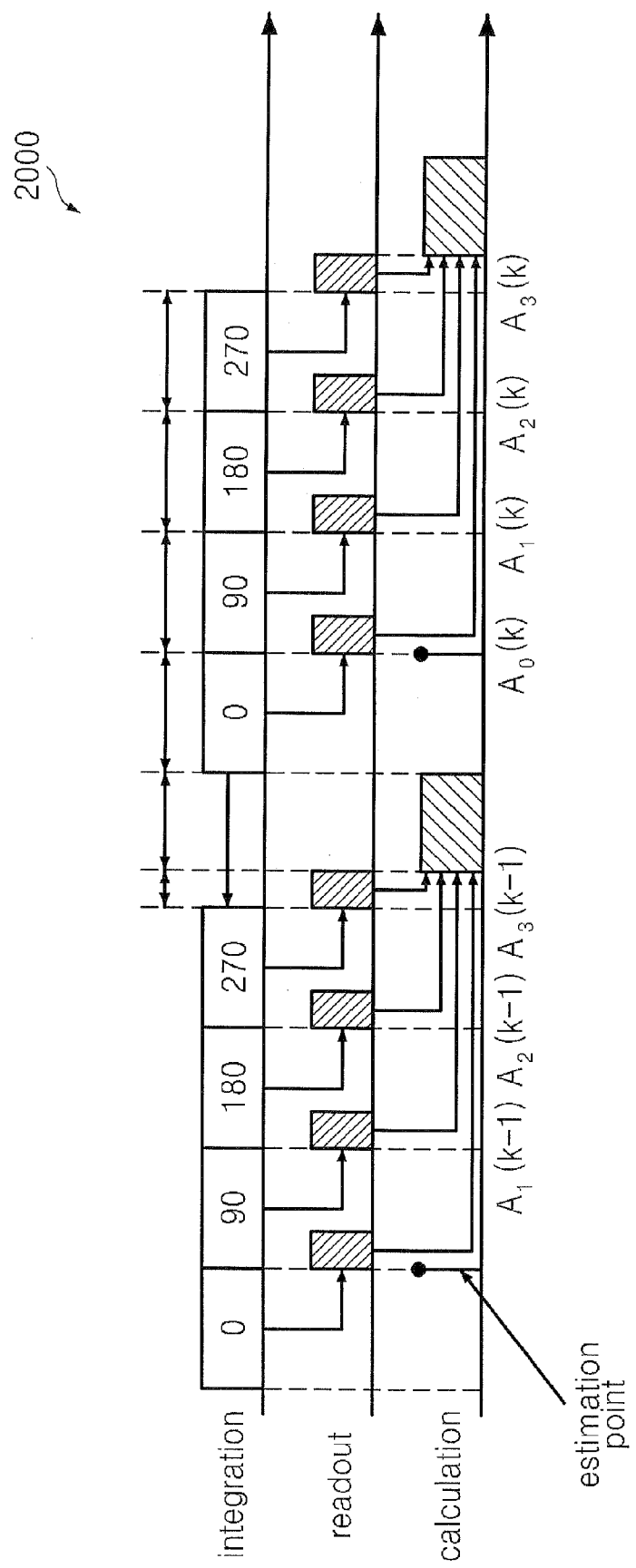
FIG. 20 is a schematic diagram of a 1-tap timing diagram illustrating the estimation process for a digital pixel signal according to the operation of the depth sensor at estimation time in accordance with an exemplary embodiment of the present disclosure.

Turning now to FIG. 20, a 1-tap timing diagram illustrating the estimation process for a digital pixel signal according to the operation of the depth sensor at estimation time is indicated generally by the reference numeral 2000. In operation, the depth estimator 1726 of FIG. 17 estimates digital signals from a different estimation time by using a plurality of digital pixel signals (A1($k$–1), A1($k$)) already measured and stored at the time when A0'($k$) is measured. Thus, first signal estimates may be made using A2($k$–1) and A2($k$), while second signal estimates may be made using A3($k$–1) and A3($k$). If the depth estimator 1726 uses a linear interpolation, then it can estimate each digital pixel signal at the time when the pixel signal (A0'($k$)) corresponding to the digital pixel signal (A0($k$)) is estimated.

The digital pixel signals produced by the depth estimator 1726 are set forth in Equations F5, F6 and F7 of Table F. Thus, the depth estimator 1726 estimates the phase difference based on the measured digital pixel signal (A0($k$)) and the estimated digital pixel signals according to Equation F8. Here, the depth estimator 1726 of the depth sensor 1710 can output estimated depth information.

Figure 21:
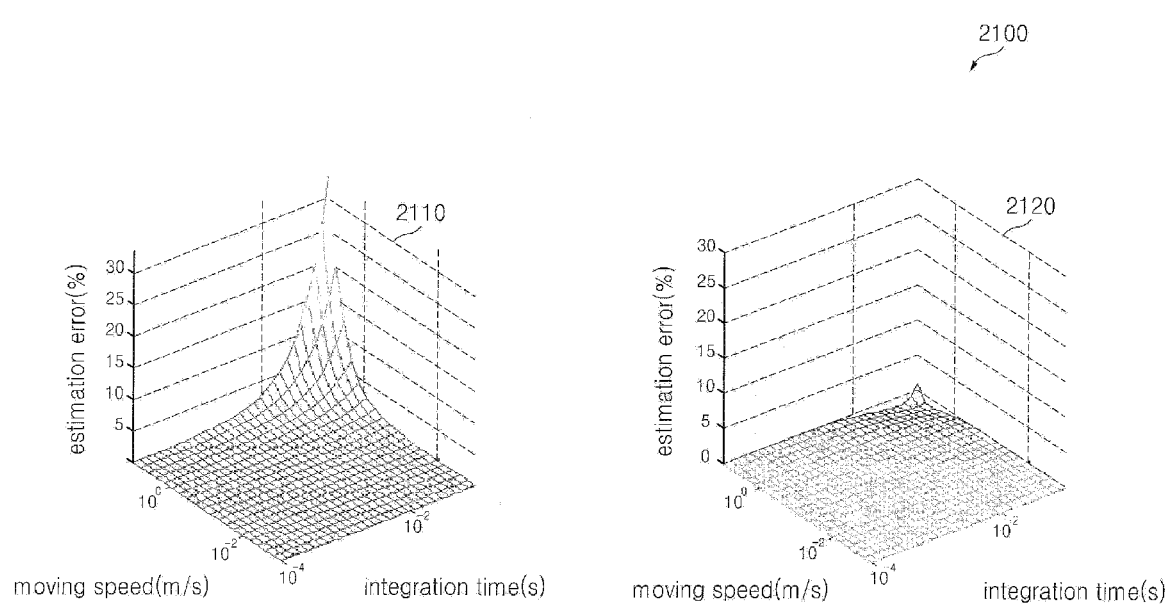
FIG. 21 is a graphical diagram of plots of 1-tap simulation results in accordance with an exemplary embodiment of the present disclosure.

Turning now to FIG. 21, plots of 1-tap simulation results are indicated generally by the reference numeral 2100. Here, a simulation graph that represents phase difference calculation error in a case where the object 1711 moves at the speed of 1 mm/s~1 m/s is shown in plot 2110, and a simulation graph that represents phase difference calculation error in a case where the object 1711 moves at the speed of 1 mm/s~1 m/s, but corrected by linear interpolation according to a preferred embodiment of the present disclosure is shown in plot 2120.

Before compensation, in the case of using a conventional algorithm, the phase difference error that is estimation error increases as the integration time increases and/or the speed of a moving object 1711 increases. After compensation, in the case of using an algorithm according to an exemplary embodiment method of the present disclosure, the phase difference calculation error is significantly decreased even if the integration time and/or speed of the object increase.

Figure 22:
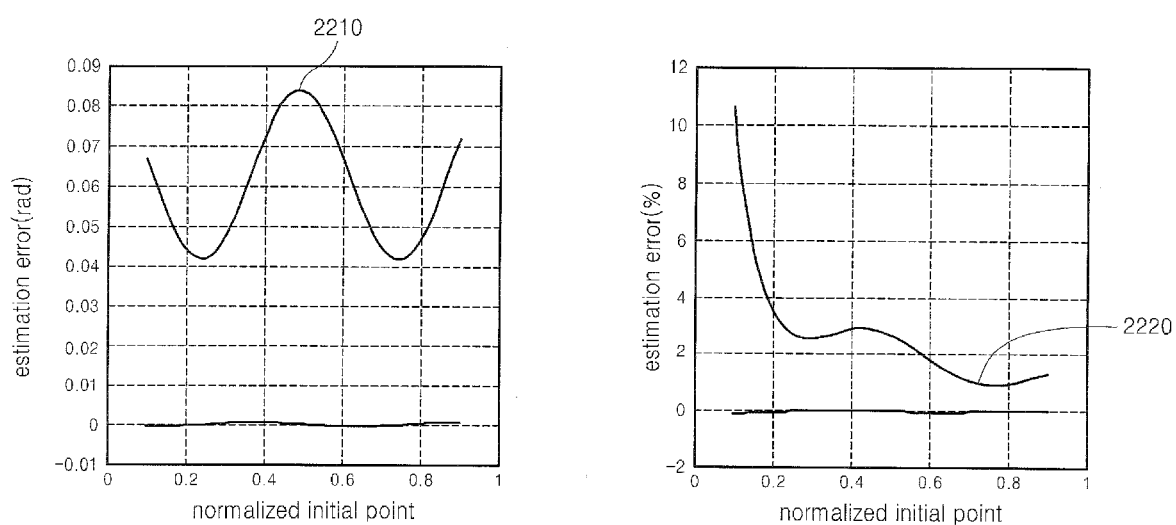
FIG. 22 is a graphical diagram of a 1-tap comparative simulation graph in accordance with an exemplary embodiment of the present disclosure.

Turning now to FIG. 22, a 1-tap comparative simulation graph is indicated generally by the reference numeral 2200. Here, the plot 2210 represents the phase difference calculation error of a conventional method, while the plot 2220 represents the phase difference calculation error of an exemplary embodiment of the present disclosure.

Figure 23:
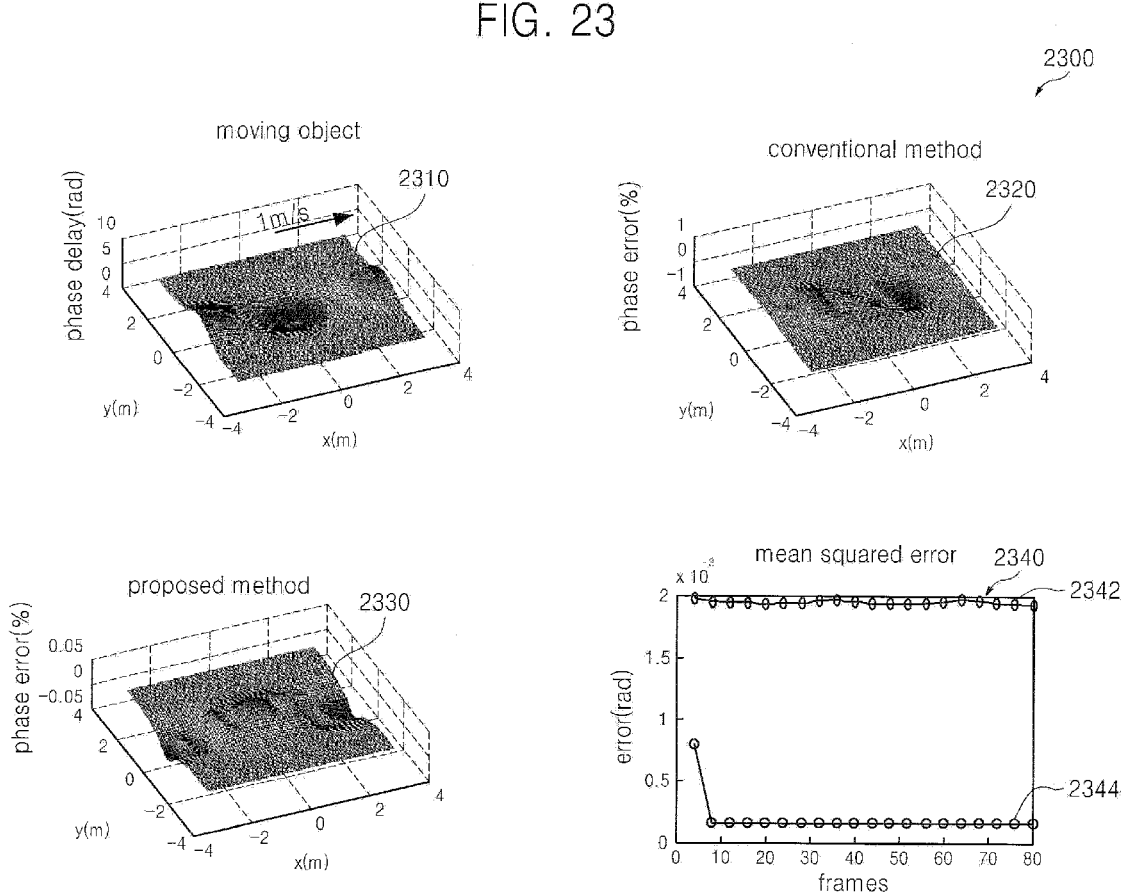
FIG. 23 is a graphical diagram of a 1-tap comparative simulation graphs in accordance with an exemplary embodiment of the present disclosure.

Turning to FIG. 23, 1-tap comparative simulation graphs are indicated generally by the reference numeral 2300. Here, the plot 2310 shows the phase difference calculation error without compensation. The plot 2320 shows the phase difference calculation error with conventional compensation. The plot 2330 shows the phase difference calculation error with compensation in accordance with an exemplary embodiment of the present disclosure. The plot 2340 shows the mean squared error for the conventional method 2342 versus an exemplary embodiment of the present disclosure 2344.

Figure 24:
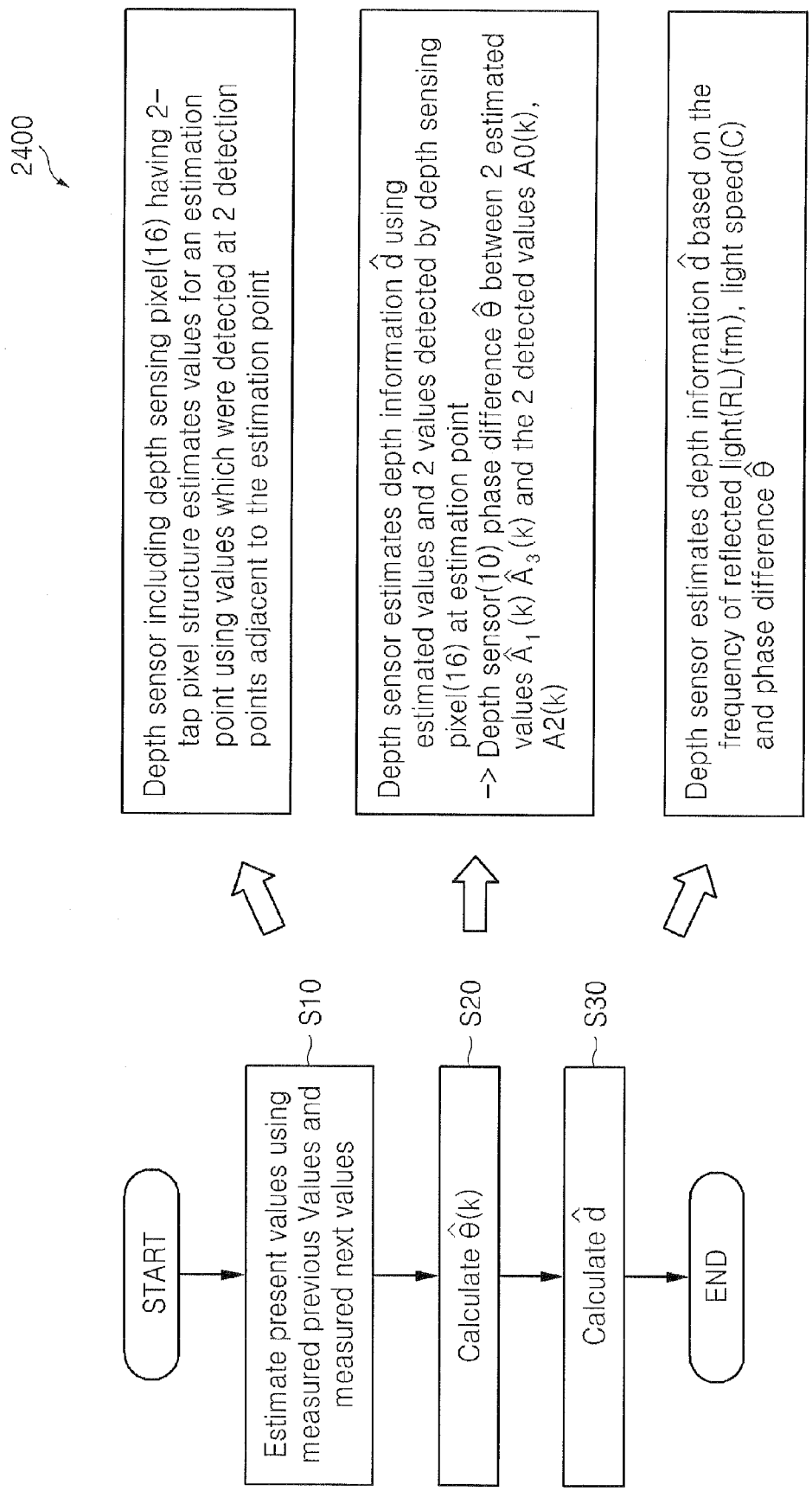
FIG. 24 is a flow diagram of a method of depth estimation in accordance with an exemplary embodiment of the present disclosure.

Turning now to FIG. 24, a method of depth estimation is indicated generally by the reference numeral 2400. The method includes a step S10 to estimate present values using measured previous values and measured next values, Here, the depth sensor including depth sensing pixels 716 of FIG. 7 having the 2-tap pixel structure estimates values for an estimation point using values that were detected at two detection points adjacent to the estimation point. Next, at a step S20, the depth sensor estimates depth information using estimated values and two values detected by depth sensing pixels 716 at the estimation point. The depth sensor 710 determines the phase difference between two estimated values and the two detected values A0($k$), A2($k$). Next, at a step S30, the depth sensor estimates depth information based on the frequency of reflected light (RL) using fm, light speed c and phase difference.

Figure 25:
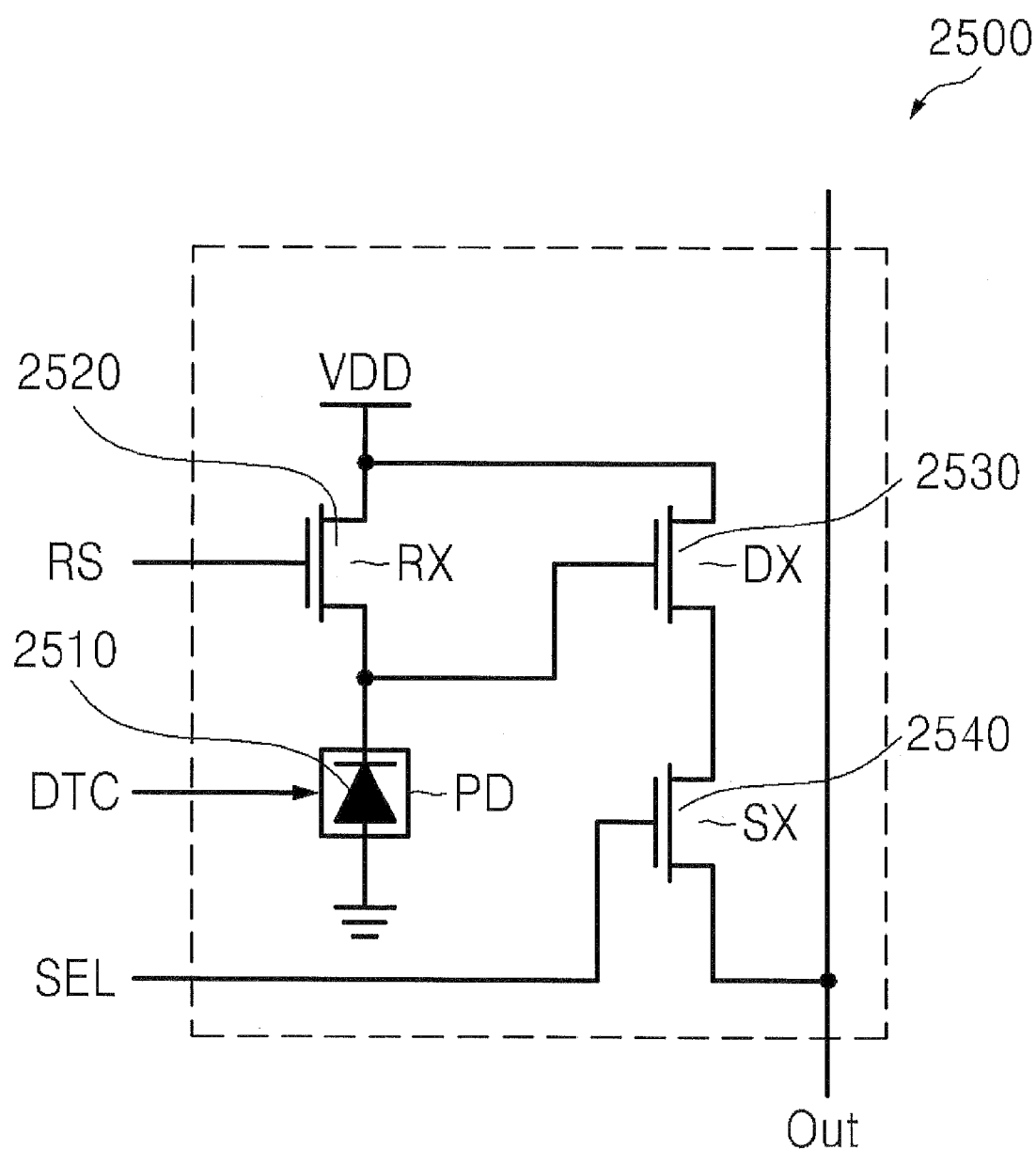
FIG. 25 is a circuit diagram of an exemplary three-transistor (3T) APS structure in accordance with an exemplary embodiment of the present disclosure.

As shown in FIG. 25, an exemplary three-transistor (3T) APS structure is indicated generally by the reference numeral 2500. The 3T structure includes a photo-diode 2510, an RX transistor 2520 connected to the photo-diode, a DX transistor 2530 connected to the photo-diode, and an SX transistor 2540 connected to the DX transistor. A preferred 3T structure of the present disclosure provides for reset and select transistor sharing, and has CDS operation enabled due to having floating diffusion (FD). An alternate embodiment shared structure is contemplated.

Figure 26:
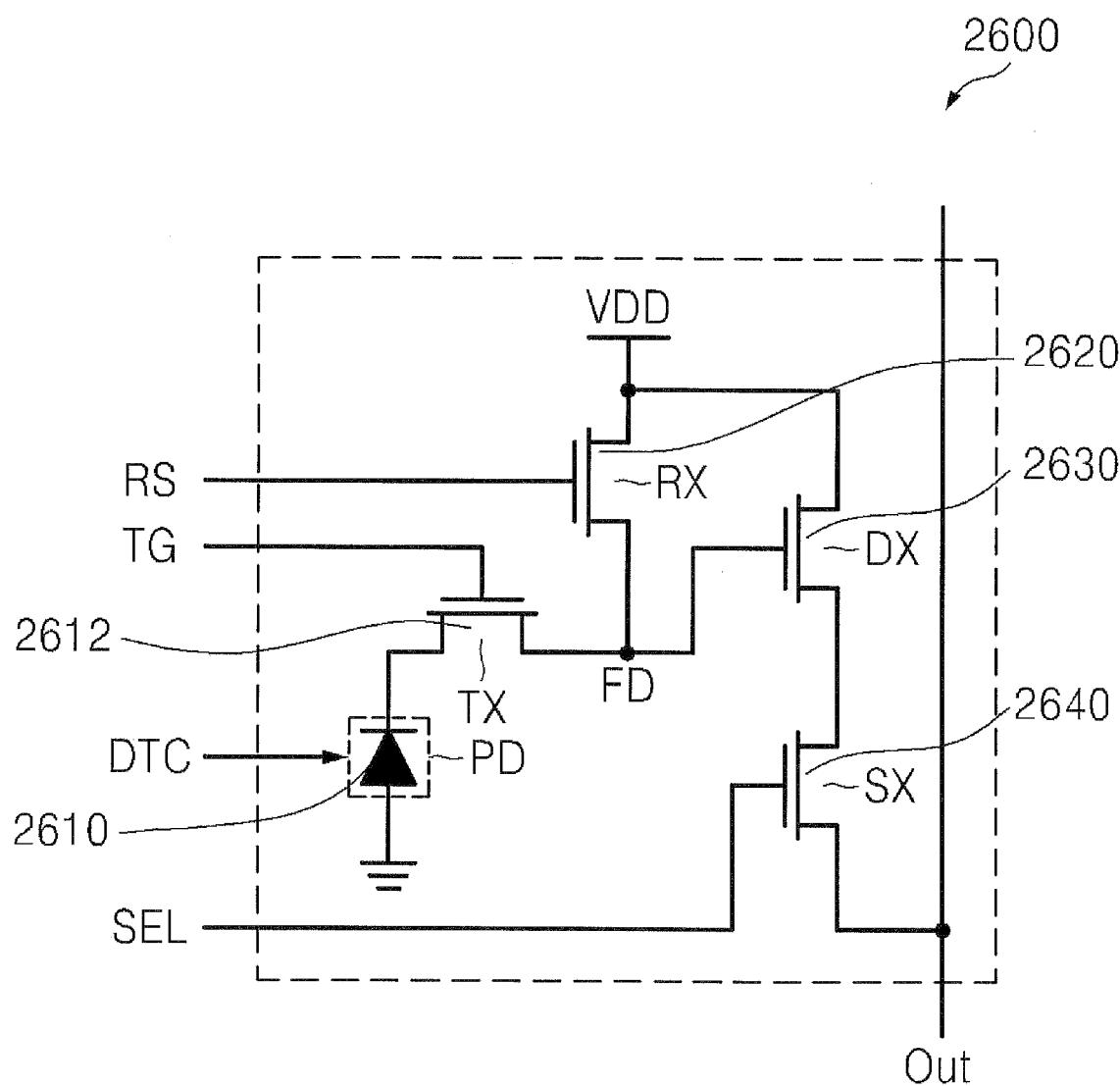
FIG. 26 is a circuit diagram of an exemplary four-transistor (4T) APS structure in accordance with an exemplary embodiment of the present disclosure.

Turning to FIG. 26, an exemplary four-transistor (4T) APS structure is indicated generally by the reference numeral 2600. The 4T structure includes a photo-diode 2610, a TX transistor 2612 connected to the photo-diode, an RX transistor 2620 connected to the TX transistor, a DX transistor 2630 connected to the TX transistor, and an SX transistor 2640 connected to the DX transistor. An alternate embodiment shared structure is contemplated.

Figure 27:
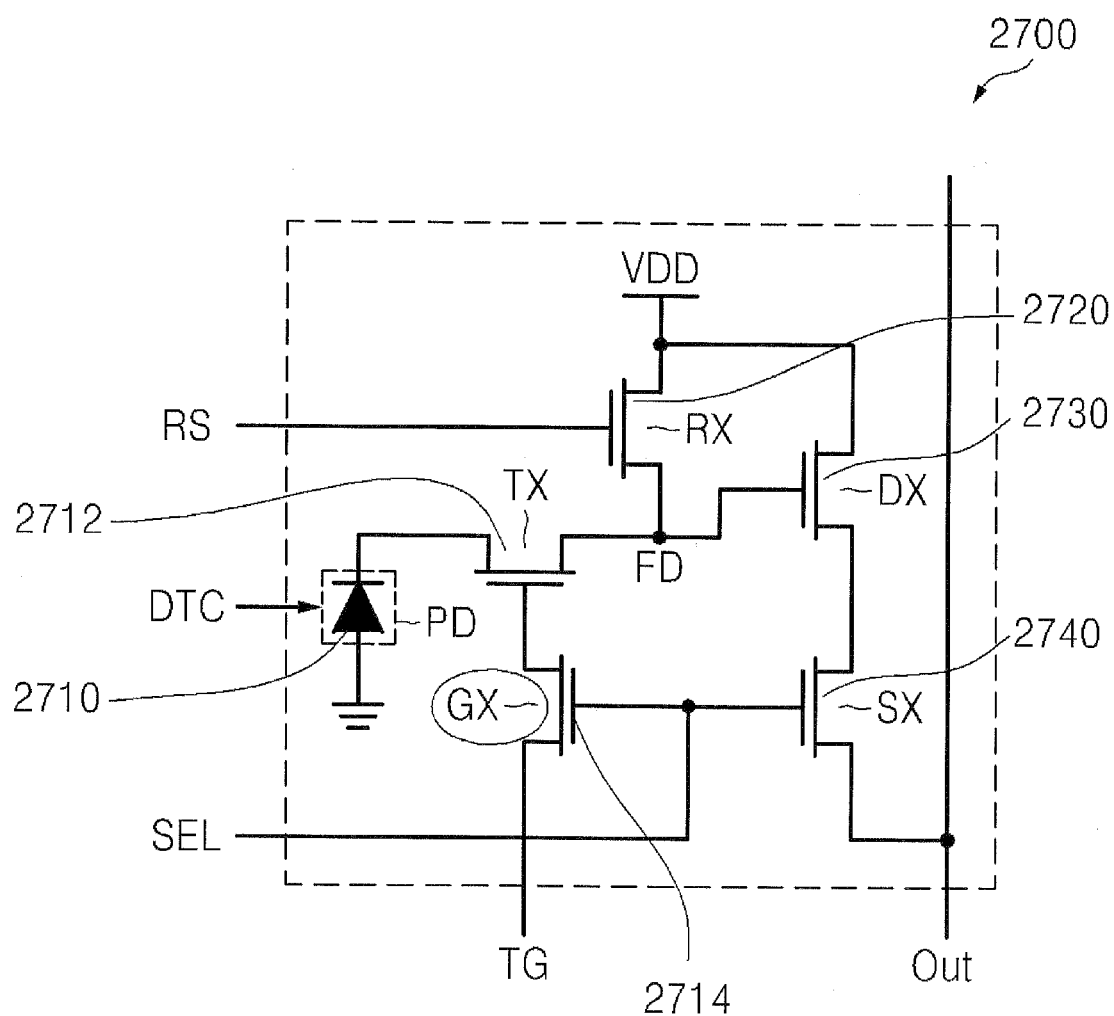
FIG. 27 is a circuit diagram of a first exemplary five-transistor (5T) APS structure in accordance with an exemplary embodiment of the present disclosure.

Turning to FIG. 27, a first exemplary five-transistor (5T) APS structure is indicated generally by the reference numeral 2700. The 5T structure includes a photo-diode 2710, a TX transistor 2712 connected to the photo-diode, a GX transistor 2714 connected to the TX transistor, an RX transistor 2720 connected to the TX transistor, a DX transistor 2730 connected to the TX transistor, and an SX transistor 2740 connected to the DX transistor. An alternate embodiment shared structure is contemplated.

Figure 28:
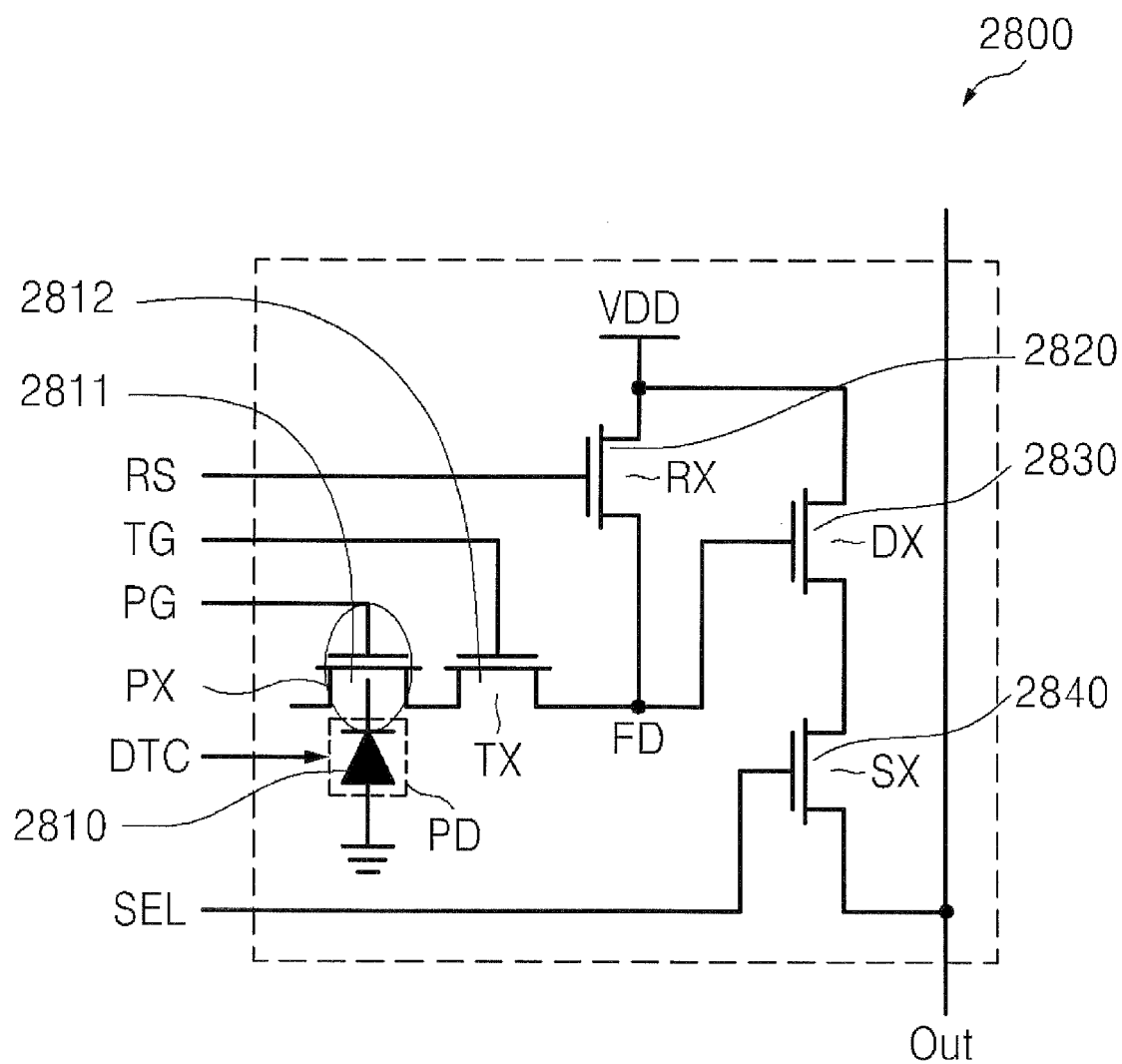
FIG. 28 is a circuit diagram of a second exemplary 5T APS structure in accordance with an exemplary embodiment of the present disclosure.

Turning to FIG. 28, a second exemplary 5T APS structure is indicated generally by the reference numeral 2800. The second 5T structure includes a photo-diode 2810, a PX transistor 2811 connected to the photo-diode, a TX transistor 2812 connected to the PX transistor, an RX transistor 2820 connected to the TX transistor, a DX transistor 2830 connected to the TX transistor, and an SX transistor 2840 connected to the DX transistor. An alternate embodiment shared structure is contemplated.

Figure 29:
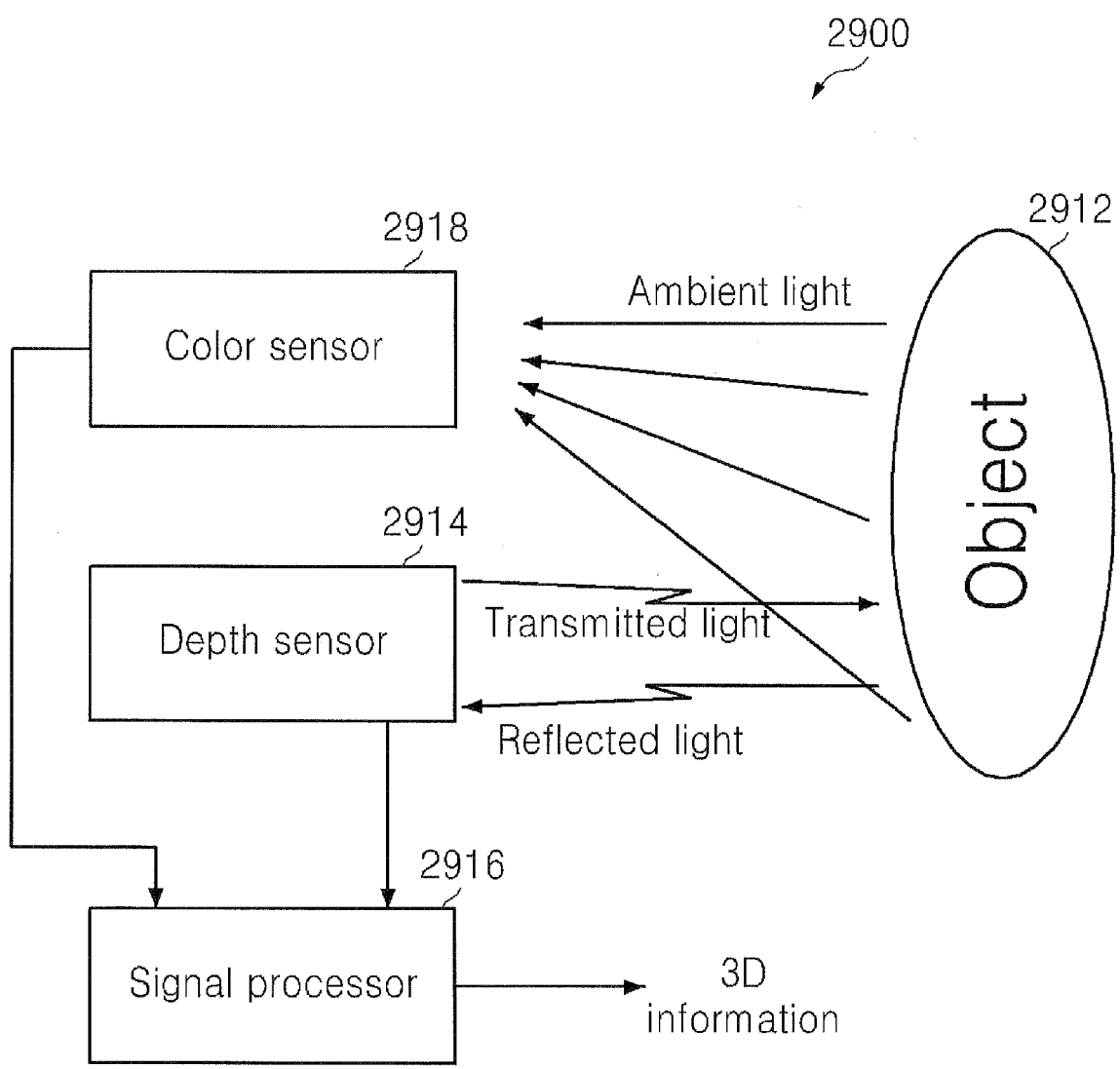
FIG. 29 is a schematic diagram of a contactless 3D shape measurement system using a two-chip solution in accordance with an exemplary embodiment of the present disclosure.

Turning to FIG. 29, a contactless 3D shape measurement system using a two-chip solution is indicated generally by the reference numeral 2900. The contactless 3D shape measurement device 2900 uses depth compensation for modulated optical time-of-flight phase estimation, and includes an emitter for transmitting light, an object or reflector 2912 for reflecting light, a depth sensor 2914 for receiving reflected light from the object, a color sensor 2918 for receiving ambient light from the object, and a signal processor 2916 in signal communication with the depth sensor and the color sensor for subtracting the ambient light from the reflected light and providing 3D information.

Figure 30:
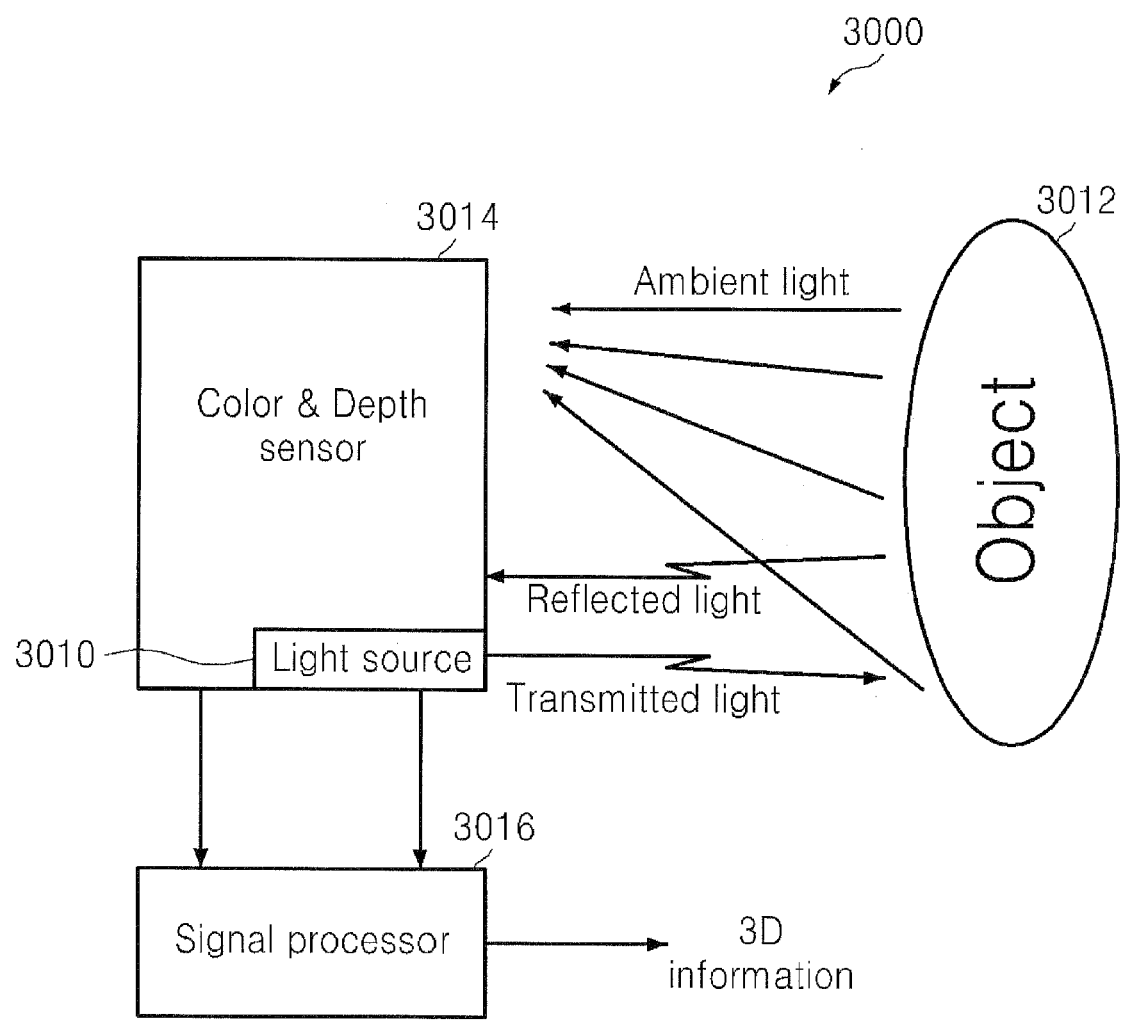
FIG. 30 is a schematic diagram of a contactless 3D shape measurement system using a single-chip solution in accordance with an exemplary embodiment of the present disclosure.

Turning to FIG. 30, a contactless 3D shape measurement system using a single-chip solution is indicated generally by the reference numeral 3000. The contactless 3D shape measurement device 3000 uses depth compensation for modulated optical time-of-flight phase estimation, and includes a light source for transmitting light, an object or reflector 3012 for reflecting light, a single-chip color and depth sensor 3014 for receiving reflected light from the object and for receiving ambient light from the object, and a signal processor 3016 in signal communication with the combined color and depth sensor for subtracting the ambient light from the reflected light and providing 3D information.

Figure 31:
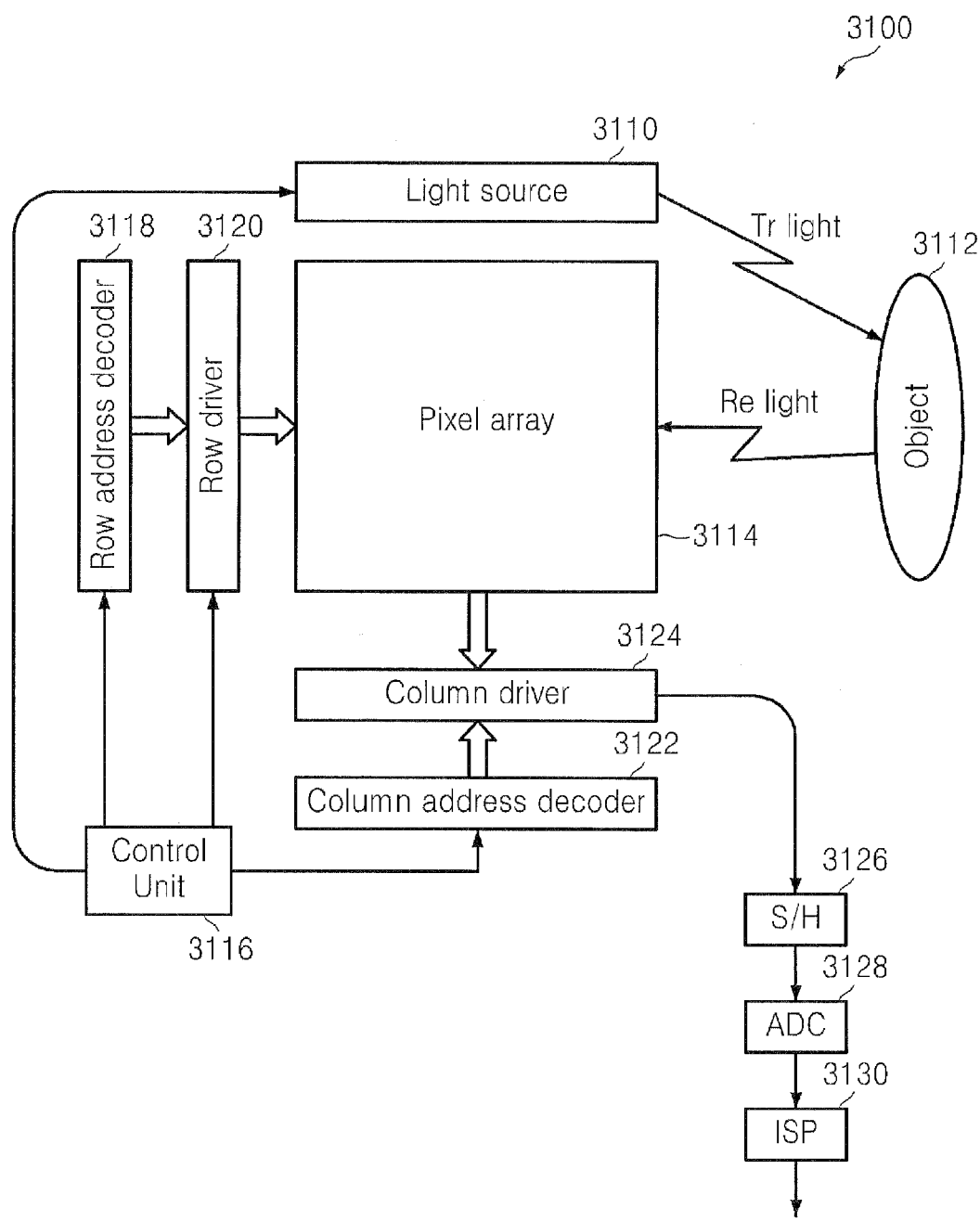
FIG. 31 is a schematic diagram of a contactless 3D shape measurement system in accordance with an exemplary embodiment of the present disclosure.

Turning now to FIG. 31, a contactless 3D shape measurement system is indicated generally by the reference numeral 3100. The contactless 3D shape measurement system 3100 includes a light source 3110 for transmitting light, an object 3112 for reflecting light, a pixel array 3114 for receiving light, a control unit 3116 for controlling the light source, a row address decoder 3118, and a column address decoder 3122, a row driver 3120 connected between the row address decoder and the pixel array, a column driver 3124 connected between the column address decoder and the pixel array, a sample and hold (S/H) register connected to the column driver, and analog-to-digital converter (ADC) connected to the S/H register, and an ISP 3130 connected to the ADC.

Figure 32:
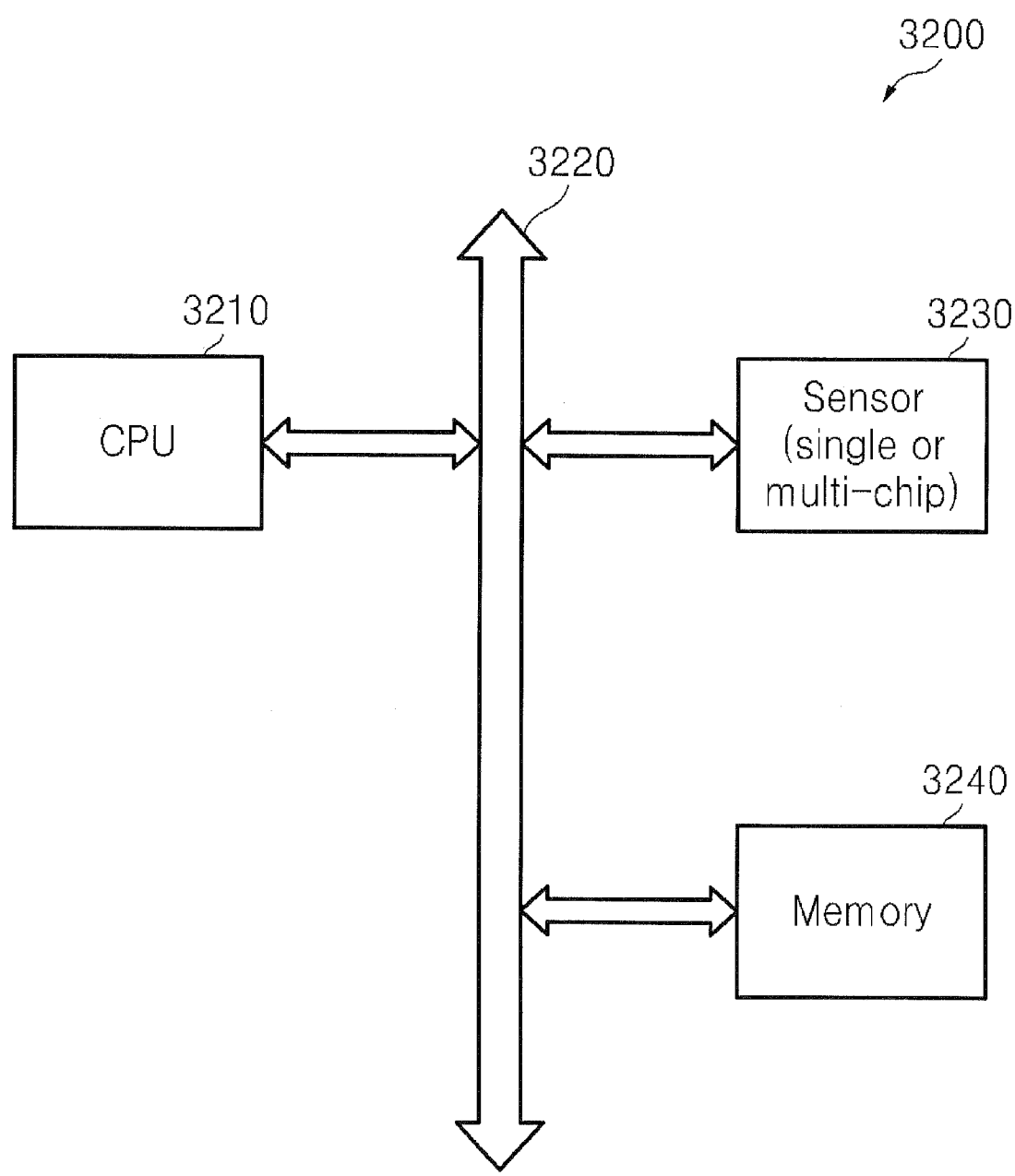
FIG. 32 is a schematic diagram of a contactless 3D shape measurement system in accordance with an exemplary embodiment of the present disclosure.

As shown in FIG. 32, a contactless 3D shape measurement system is indicated generally by the reference numeral 3200. The contactless 3D shape measurement system 3200 includes a central processing unit (CPU) 3210 connected to a system bus 3220, a single or multi-chip sensor 3230 connected to the system bus, and a memory 3240 connected to the system bus.

Figure 33:
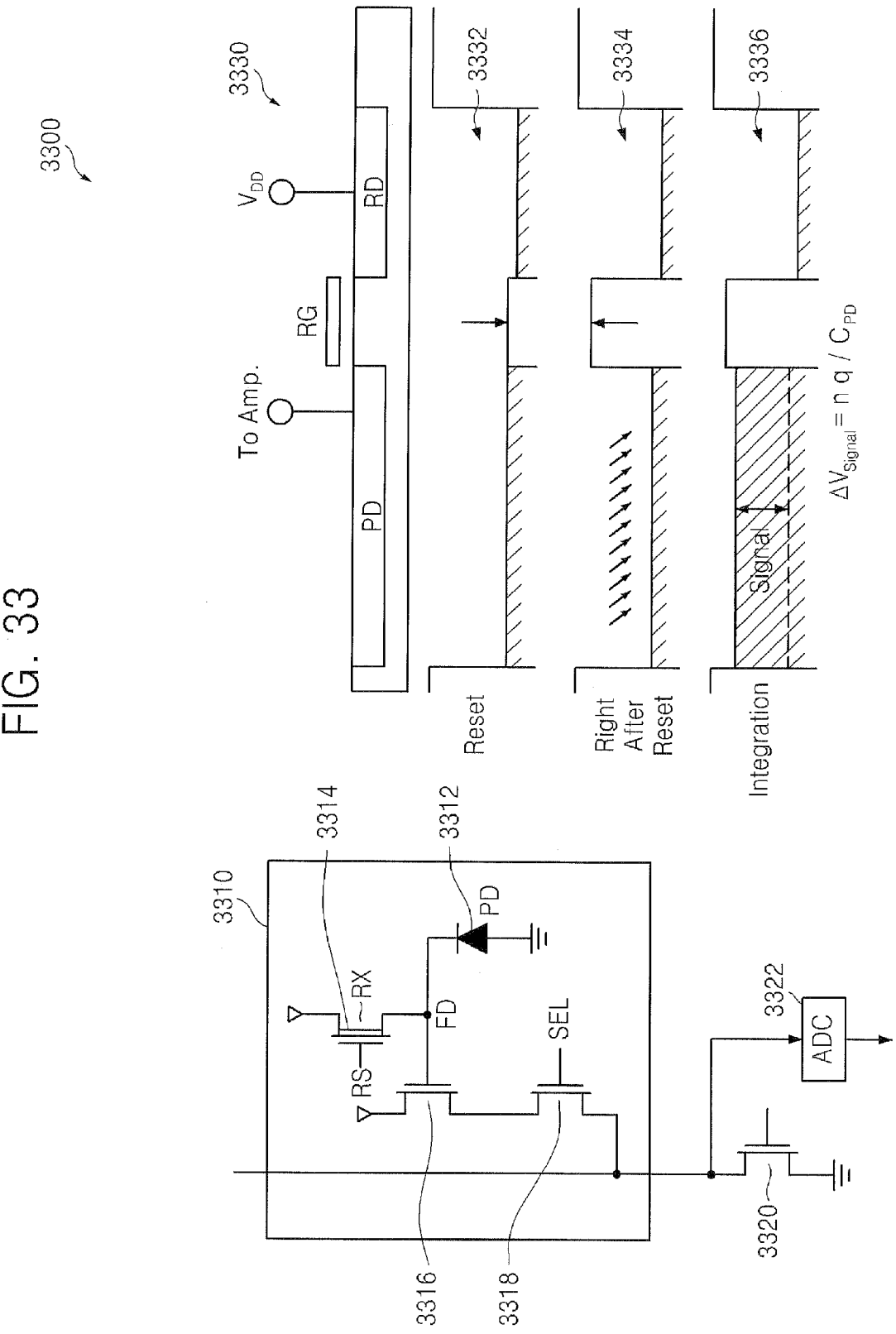
FIG. 33 is a schematic diagram of a contactless 3D shape measurement partial circuit and schematic signal diagram in accordance with an exemplary embodiment of the present disclosure.

Turning now to FIG. 33, a contactless 3D shape measurement partial circuit and schematic signal diagram are indicated generally by the reference numeral 3300. The partial circuit 3310 includes a photo-diode 3312 connected to a reset transistor 3314 and a floating diffusion transistor 3316, which, in turn, is connected to a selection transistor 3318. A grounding transistor 3320 and an analog-to-digital converter 3322 are each connected to the selection transistor. The signal diagram 3330 includes a reset state 3332, in which the PD, RG and RD signal levels are low; a right-after-reset state, in which the PD level is rising, the RG level is high, and the RD level is low; and an integration state, in which the PD and RG levels are high and the RD level is low.

Figure 34:
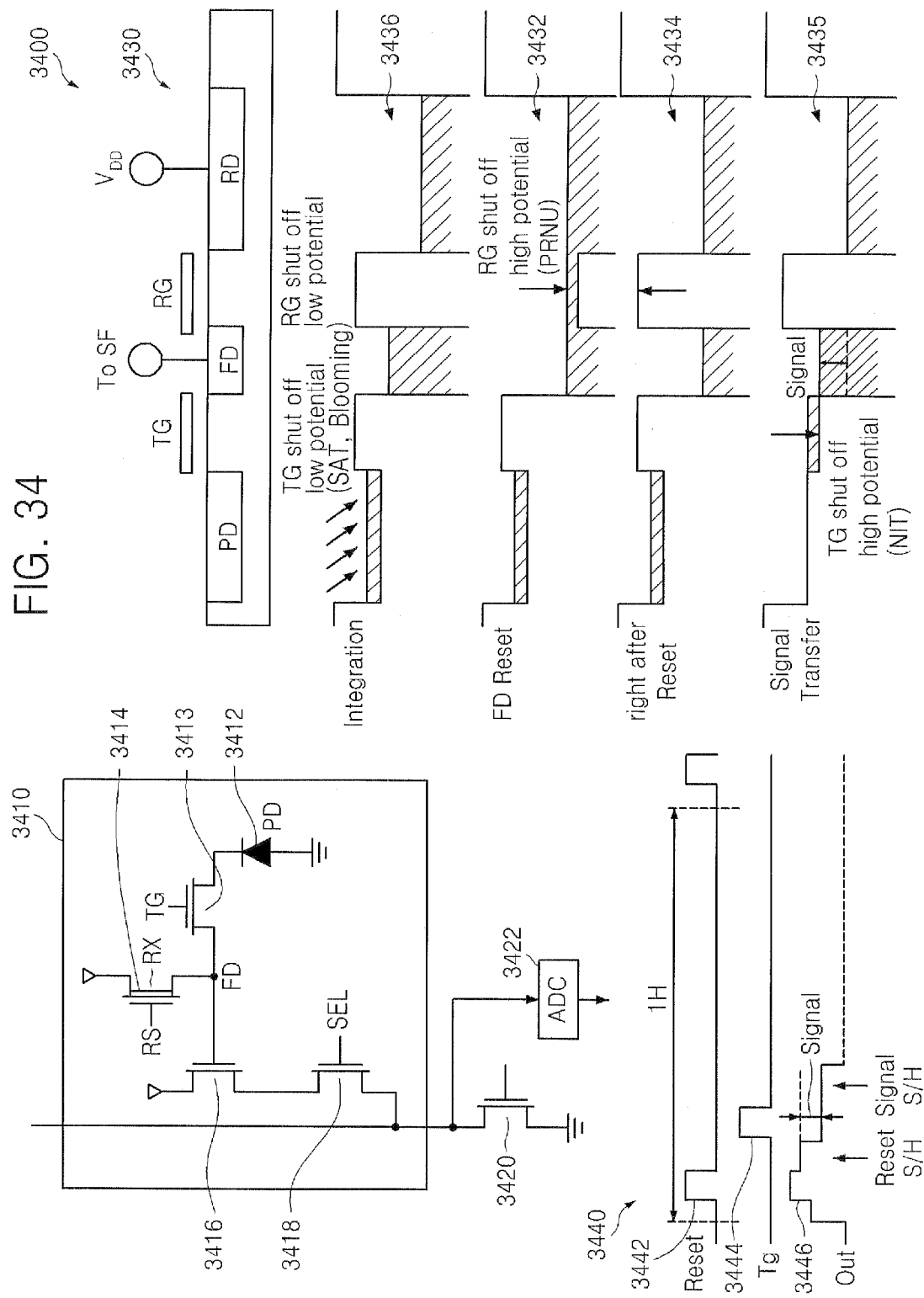
FIG. 34 is a schematic diagram of a contactless 3D shape measurement partial circuit and schematic signal diagram in accordance with an exemplary embodiment of the present disclosure.

As shown in FIG. 34, a contactless 3D shape measurement partial circuit and schematic signal diagram are indicated generally by the reference numeral 3400. The partial circuit 3410 includes a photo-diode 3412 connected to a pass transistor 3413, a reset transistor 3414 and a floating diffusion transistor 3416 connected to the pass transistor, and a selection transistor 3418 connected to the floating diffusion transistor. A grounding transistor 3420 and an analog-to-digital converter 3422 are each connected to the selection transistor.

The signal diagram 3430 includes an integration state in which the PD, TG, FD and RG levels are high while the RD level is low; an FD reset state 3432 in which the PD and TG levels are high while the FD, RG and RD levels are low; a right-after-reset state, in which the PD, TG and RG levels are high while the FD and RD levels are low; and a signal transfer state 3435 in which the FD and RG levels are high while the PD, TG and RD levels are low. The timing diagram 3440 includes a reset signal activated first, a TG signal activated second, and an output signal that is step-wise decreasing after the reset signal.

Figure 35:
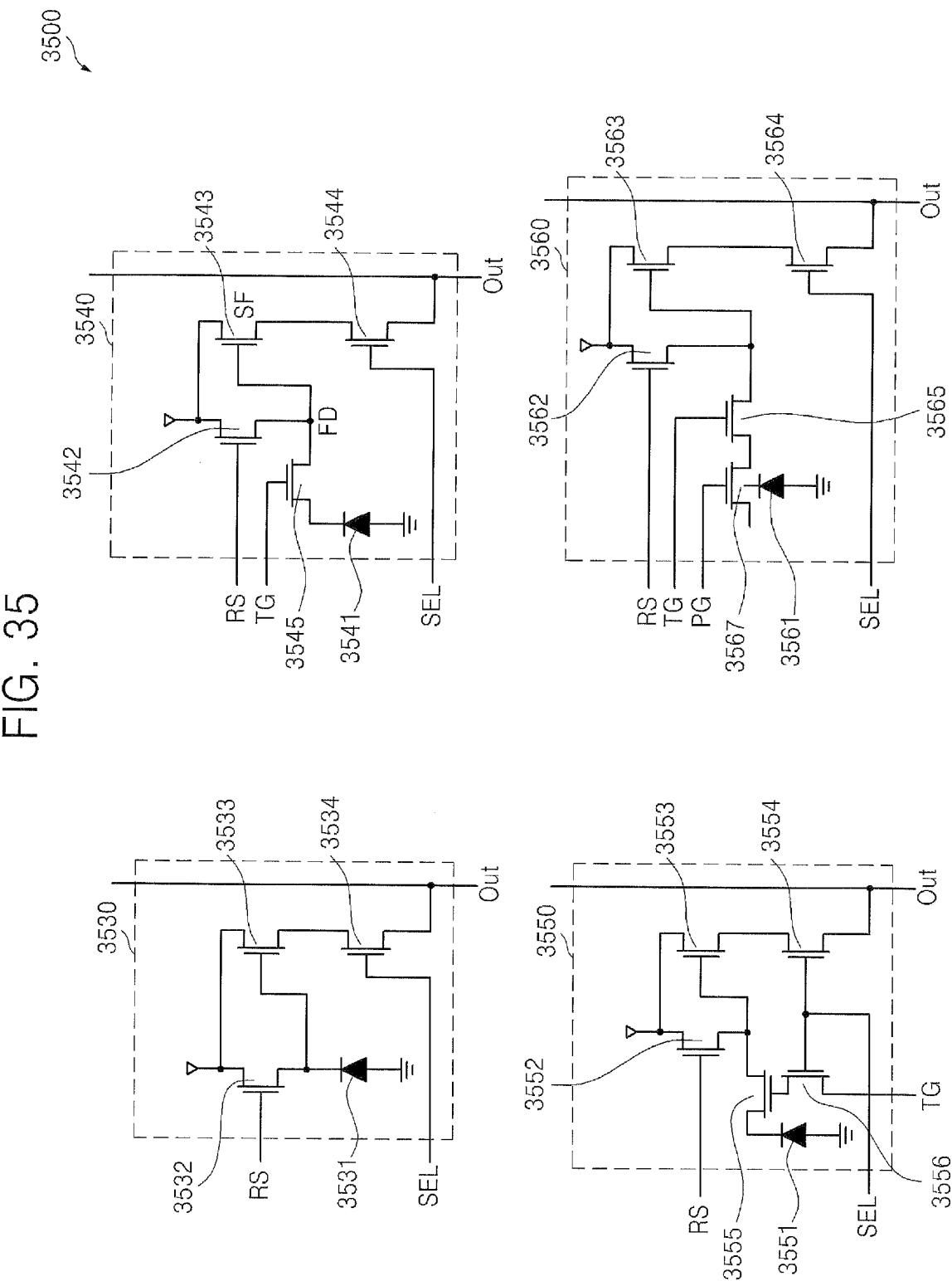
FIG. 35 is a circuit diagram of APS structures in accordance with exemplary embodiments of the present disclosure.

Turning to FIG. 35, APS structures are indicated generally by the reference numeral 3500. An exemplary three-transistor (3T) APS structure 3530 includes a photo-diode 3531, an RX transistor 3532 connected to the photo-diode, a DX transistor 3533 connected to the photo-diode, and an SX transistor 3534 connected to the DX transistor. The 3T structure features a simple process, a high fill factor, pixel reset noise, and a low signal-to-noise ratio.

An exemplary four-transistor (4T) APS structure 3540 includes a photo-diode 3541, a TX transistor 3545 connected to the photo-diode, an RX transistor 3542 connected to the TX transistor, a DX transistor 3543 connected to the TX transistor, and an SX transistor 3544 connected to the DX transistor. The 4T structure features a process for a low shallow potential photodiode, a low fill factor, a low dark level, higher sensitivity, CDS operation, and impractical SFCM.

An exemplary five-transistor (5T) APS structure 3550 includes a photo-diode 3551, a TX transistor 3555 connected to the photo-diode, a GX transistor 3552 connected to the TX transistor, an RX transistor 3553 connected to the TX transistor, a DX transistor 3556 connected to the TX transistor, and an SX transistor 3554 connected to the DX transistor. The 5T structure features an addressed readout, full random access, possible single CDS, and the lowest fill factor.

A photogate structure 3560 includes a photodiode 3561, a PX transistor 3567 connected to the photodiode, a TX transistor 3565 connected to the PX transistor, an RX transistor 3562 connected to the TX transistor, a DX transistor 3563 connected to the TX transistor, and an SX transistor 3564 connected to the DX transistor. The photogate structure features a simple process, operation like the 4T structure, signal charge shifting by PG and TG pulses, an additional signal line, and low blue response.

In the claims, any means-plus-function clauses are intended to cover the structures described herein as performing the recited function, and not only structural equivalents but also equivalent structures. Therefore, it is to be understood that the foregoing is illustrative of the inventive concept and is not to be construed as limited to the specific embodiments disclosed, and that modifications to the disclosed exemplary embodiments, as well as other exemplary embodiments, are intended to be included within the scope of the appended claims. The inventive concept is defined by the following claims, with equivalents of the claims to be included therein.

These and other features of the present disclosure may be readily ascertained by one of ordinary skill in the pertinent art based on the teachings herein. Although illustrative embodiments have been described herein with reference to the accompanying drawings, it is to be understood that the present disclosure is not limited to those precise embodiments, and that various other changes and modifications may be effected therein by those of ordinary skill in the pertinent art without departing from the scope or spirit of the present disclosure. All such changes and modifications are intended to be included within the scope of the present disclosure as set forth in the appended claims.

TABLE A

| | |
|---|---|
| $A_0 \approx \alpha + \beta\cos\theta$ | (Eqn. A1) |
| $A_2 \approx \alpha - \beta\cos\theta$ | (Eqn. A2) |
| $A_1 \approx \alpha + \beta\sin\theta$ | (Eqn. A3) |
| $A_3 \approx \alpha - \beta\sin\theta$ | (Eqn. A4) |
| $t_\Delta = \dfrac{2d}{c}$ | (Eqn. A5) |
| $A_k = \sum_{n=1}^{N} a_{k,n} N = f_m T_{int}$ | (Eqn. A6) |
| $\hat{\theta} = 2\pi f_m t_\Delta = \tan^{-1}\dfrac{A_1 - A_3}{A_0 - A_2}$ | (Eqn. A7) |
| $\hat{d} = \dfrac{c}{4\pi f_m}\hat{\theta}$ | (Eqn. A8) |

TABLE B $$P_{IR\,source} \propto \frac{N_e \frac{A_{imagel}}{A_{pixel}} hc}{p\left[\frac{D}{2R}\right] k_{lens} QE(\lambda) \lambda T_{int}} \quad \text{(Eqn. B1)}$$

$$P_{opt}(t) = P_0 + P_0 \cdot \sin(2\pi f_{mod} t) \quad \text{(Eqn. B2)}$$

$$N_{el}(t) = B_{meas} + A_{meas} \cdot \sin(2\pi f_{mod} t + \varphi) \quad \text{(Eqn. B3)}$$

$$\varphi = \arctan\left[\frac{A_0 - A_2}{A_1 - A_3}\right] \quad \text{(Eqn. B4)}$$

$$L = \frac{c}{4\pi \cdot f_{mod}} \cdot \varphi \quad \text{(Eqn. B5)}$$

$$\Delta L \propto \frac{\sqrt{B}}{f_{mod} A} \quad \text{(Eqn. B6)}$$

TABLE C $$t_1 = t_0 + T_{int} \quad \text{(Eqn. C1)}$$

$$\theta = \tan^{-1} \frac{A_1(t_1) - A_3(t_1)}{A_0(t_0) - A_2(t_0)} \quad \text{(Eqn. C2)}$$

$$\theta = \tan^{-1} \frac{A_1(t_1) - A_3(t_3)}{A_0(t_0) - A_2(t_2)} \quad \text{(Eqn. C3)}$$

TABLE D $$\hat{A}_1(k) = f(A_1(k), A_1(k-1)) \quad \text{(Eqn. D1)}$$

$$\hat{A}_1(k) = \frac{(t_2 - t_1)A_1(k) + (t_3 - t_2)A_1(k-1)}{t_3 - t_1} \quad \text{(Eqn. D2)}$$

$$\hat{\theta}(k) = \tan^{-1} \frac{\hat{A}_1(k) - \hat{A}_3(k)}{A_0(k) - A_2(k)} \quad \text{(Eqn. D3)}$$

TABLE E $$t_\Delta = \frac{2d}{c} \quad \text{(Eqn. E1)}$$

$$A'_k = \sum_{n=1}^{N} a_{k,n} \quad \text{(Eqn. E2)}$$

$$\hat{\theta} = 2\pi f_m t_\Delta = \tan^{-1} \frac{A_1 - A_3}{A_0 - A_2} \quad \text{(Eqn. E3)}$$

$$\hat{d} = \frac{c}{4\pi f_m} \hat{\theta} \quad \text{(Eqn. E4)}$$

$$\hat{\theta} = \tan^{-1} \frac{A_1(t_1) - A_3(t_1)}{A_0(t_0) - A_2(t_0)} \quad \text{(Eqn. E5)}$$

$$\hat{A}_1(k) = f(A_1(k), A_1(k-1)) \quad \text{(Eqn. E6)}$$

$$\hat{A}_1(k) = \frac{(t_2 - t_1)A_1(k) + (t_3 - t_2)A_1(k-1)}{t_3 - t_1} \quad \text{(Eqn. E7)}$$

$$\hat{\theta}(k) = \tan^{-1} \frac{\hat{A}_1(k) - \hat{A}_3(k)}{A_0(k) - A_2(k)} \quad \text{(Eqn. E8)}$$

TABLE E-continued $$\hat{\theta}(k) = \tan^{-1} \frac{\hat{A}_1(k) - \hat{A}_3(k)}{A_0(k) - A_2(k)} \quad \text{(Eqn. E9)}$$

$$\hat{\theta} = 2\pi f_m t_\Delta = \tan^{-1} \frac{A_1 - A_3}{A_0 - A_2} \quad \text{(Eqn. E10)}$$

$$\hat{A}_1(k) = \frac{(T_{int} + T_{read} + T_{cal})A_1(k) + T_{int} A_1(k-1)}{2T_{int} + T_{read} + T_{cal}} \quad \text{(Eqn. E11)}$$

$$\hat{A}_3(k) = \frac{(T_{int} + T_{read} + T_{cal})A_3(k) + T_{int} A_3(k-1)}{2T_{int} + T_{read} + T_{cal}} \quad \text{(Eqn. E12)}$$

TABLE F $$t_\Delta = \frac{2d}{c} \quad \text{(Eqn. F1)}$$

$$A'_k = \sum_{n=1}^{N} a_{k,n} \quad \text{(Eqn. F2)}$$

$$N = f_m * T_{int} \quad \text{(Eqn. F3)}$$

$$\hat{\theta} = \tan^{-1} \frac{A_1(t_1) - A_3(t_3)}{A_0(t_0) - A_2(t_2)} \quad \text{(Eqn. F4)}$$

$$\hat{A}_1(k) = \frac{(3T_{int} + T_{read} + T_{cal})A_1(k) + T_{int} A_1(k-1)}{4T_{int} + T_{read} + T_{cal}} \quad \text{(Eqn. F5)}$$

$$\hat{A}_2(k) = \frac{(2T_{int} + T_{read} + T_{cal})A_2(k) + 2T_{int} A_2(k-1)}{4T_{int} + T_{read} + T_{cal}} \quad \text{(Eqn. F6)}$$

$$\hat{A}_3(k) = \frac{(T_{int} + T_{read} + T_{cal})A_3(k) + 3T_{int} A_3(k-1)}{4T_{int} + T_{read} + T_{cal}} \quad \text{(Eqn. F7)}$$

$$\hat{\theta}(k) = \tan^{-1} \frac{\hat{A}_1(k) - \hat{A}_3(k)}{A_0(k) - \hat{A}_2(k)} \quad \text{(Eqn. F8)}$$

What is claimed is:

1. A distance measurement method comprising:
   emitting light and receiving reflected light from a target;
   measuring a plurality of integrated signals at a plurality of modulation phase offsets according to the reflected light;
   estimating at least one integrated signal for at least one of the plurality of modulation phase offsets, respectively, to adjust its reception time relative to an integrated signal for another of the plurality of modulation phase offsets; and
   determining a distance between the target and receiver based upon the estimated at least one signal,
   wherein the estimating comprises:
   interpolating at least one first integrated signal at a first time with at least one second integrated signal at a second time to obtain at least one integrated signal,
   wherein the first and second integrated signals are measured at the same modulation phase offset, respectively.

2. The method of claim 1, further comprising:
   emitting narrow band electromagnetic energy as a modulated continuous wave; and
   receiving and integrating signals indicative of electromagnetic energy reflected from a target for the plurality of modulation phase offsets.

3. The method of claim 1,
wherein the first time is before the reception time of the integrated signal for the other of the plurality of modulation phase offsets, and the second time is after the reception time of the integrated signal for the other of the plurality of modulation phase offsets.

4. The method of claim 1, estimating comprising extrapolating the at least one integrated signal at a current time from the at least one integrated signal at a plurality of previous times,
wherein the current time is the reception time of the integrated signal for the other of the plurality of modulation phase offsets.

5. A distance measurement method comprising:
measuring a plurality of integrated signals at a plurality of modulation phase offsets;
estimating at least one integrated signal for at least one of the plurality of modulation phase offsets, respectively, to adjust its reception time relative to an integrated signal for another of the plurality of modulation phase offsets; and
determining a distance between the target and receiver based upon the estimated at least one signal,
wherein the estimating comprises:
splitting a time difference between a first integrated signal and a second integrated signal to obtain a median time,
interpolating the first integrated signal at a first time with the first integrated signal at a third time to obtain an estimated first integrated signal at the median time, wherein the first time is before the median time and the third time is after the median time, and
interpolating the second integrated signal at a second time with the second integrated signal at a fourth time to obtain an estimated second integrated signal at the median time, wherein the second time is before the median time and the fourth time is after the median time.

6. The method of claim 2 wherein the narrow band electromagnetic energy has a wavelength between about 850 and about 950 nanometers.

7. The method of claim 1 wherein the plurality of modulation phase offsets comprises four equally spaced offsets.

8. The method of claim 7 wherein first, second, third and fourth signals for zero degree, 90 degree, 180 degree and 270 degree phase offsets, respectively.

9. A distance measurement system comprising:
an emitter for emitting light;
a sensor for receiving reflected light from a target; and
a control unit for measuring a plurality of integrated signals at a plurality of modulation phase offsets according to the reflected light, estimating at least one integrated signal for at least one of the plurality of modulation phase offsets, respectively, to adjust its reception time relative to an integrated signal for another of the plurality of modulation phase offsets, and determining a distance between the target and the sensor based upon the compensated at least one signal,
wherein the control unit comprises an estimation unit for interpolating the at least one first integrated signal at a first time with the at least one second integrated signal at a second time to obtain at least one integrated signal,
wherein the first and second integrated signals are measured at the same modulation phase offset, respectively.

10. The system of claim 9 wherein the emitter emits narrow band electromagnetic energy with a wavelength between about 850 and about 950 nanometers.

11. The system of claim 9 wherein the plurality of modulation phase offsets comprises four equally spaced offsets.

12. The system of claim 11 wherein first and third signals for zero degree and 180 degree phase offsets, respectively, and second and fourth signals for 90 degree and 270 degree phase offsets, respectively.

13. The system of claim 11 wherein first, second, third and fourth signals for zero degree, 90 degree, 180 degree and 270 degree phase offsets, respectively.

14. The system of claim 13 wherein the sensor comprises color pixels and distance pixels, the color pixels disposed on a first integrated circuit and the distance pixels disposed on a second integrated circuit.

15. The system of claim 13 wherein the sensor comprises color pixels and distance pixels on a single integrated circuit.

16. The system of claim 9, wherein the first time is before the reception time of the integrated signal for the other of the plurality of modulation phase offsets, and the second time is after the reception time of the integrated signal for the other of the plurality of modulation phase offsets.

17. The system of claim 9, the control unit comprising a estimation unit for extrapolating the at least one integrated signal at a current time from the at least one integrated signal at a plurality of previous times, wherein the current time is the reception time of the integrated signal for the other of the plurality of modulation phase offsets.

18. A distance sensor comprising:
an emitter for emitting light;
a sensor array for receiving reflected light from a target; and
a control unit for measuring a plurality of integrated signals at a plurality of modulation phase offsets according to the reflected light, estimating at least one integrated signal for at least one of the plurality of modulation phase offsets, respectively, to adjust its reception time relative to an integrated signal for another of the plurality of modulation phase offsets, and determining a distance between the target and the sensor array based upon the estimated at least one signal,
wherein the control unit comprises an estimation unit for interpolating the at least one first integrated signal at a first time with the at least one second integrated signal at a second time to obtain at least one integrated signal, and
wherein the first and second integrated signals are measured at the same modulation phase offset, respectively.

19. The sensor of claim 18, the sensor array comprising a plurality of pixels for sequentially acquiring signal samples at the plurality of modulation phase offsets.

20. The sensor of claim 18, the sensor array comprising:
a first sensor for sequentially acquiring signal samples at a plurality of first modulation phase offsets; and
a second sensor for sequentially acquiring signal samples at a plurality of second modulation phase offsets,
wherein the first and second modulation phase offsets alternate in sequence.

21. The sensor of claim 18 wherein the plurality of modulation phase offsets comprises four equally spaced offsets.

22. The sensor of claim 21 wherein first, second, third and fourth signals for zero degree, 90 degree, 180 degree and 270 degree phase offsets, respectively.

23. The sensor of claim 21 wherein first and third signals for zero degree and 180 degree phase offsets, respectively, are received and integrated by the photo sensing array, and second and fourth signals for 90 degree and 270 degree phase offsets, respectively.

24. The sensor of claim 21 wherein first, second, third and fourth signals for zero degree, 90 degree, 180 degree and 270 degree phase offsets, respectively.

25. The sensor of claim 24 wherein the sensor array comprises color pixels and distance pixels, the color pixels disposed on a first integrated circuit and the distance pixels disposed on a second integrated circuit.

26. The sensor of claim 24 wherein the sensor array comprises color pixels and distance pixels on a single integrated circuit.

27. The sensor of claim 18, wherein the first time is before the reception time of the integrated signal for the other of the plurality of modulation phase offsets, and the second time is after the reception time of the integrated signal for the other of the plurality of modulation phase offsets.

28. The sensor of claim 18, the control unit comprising an estimation unit for extrapolating the at least one integrated signal at a current time from the at least one integrated signal at a plurality of previous times, wherein the current time is the reception time of the integrated signal for the other of the plurality of modulation phase offsets.

29. The sensor of claim 18, the sensor array comprising:
   a first integrated circuit for acquiring signal samples for color pixels; and
   a second integrated circuit for acquiring signal samples for distance pixels.

30. The sensor of claim 18, the sensor array comprising: a first integrated circuit for acquiring signal samples for color and distance pixels.

* * * * *